Figure 1:
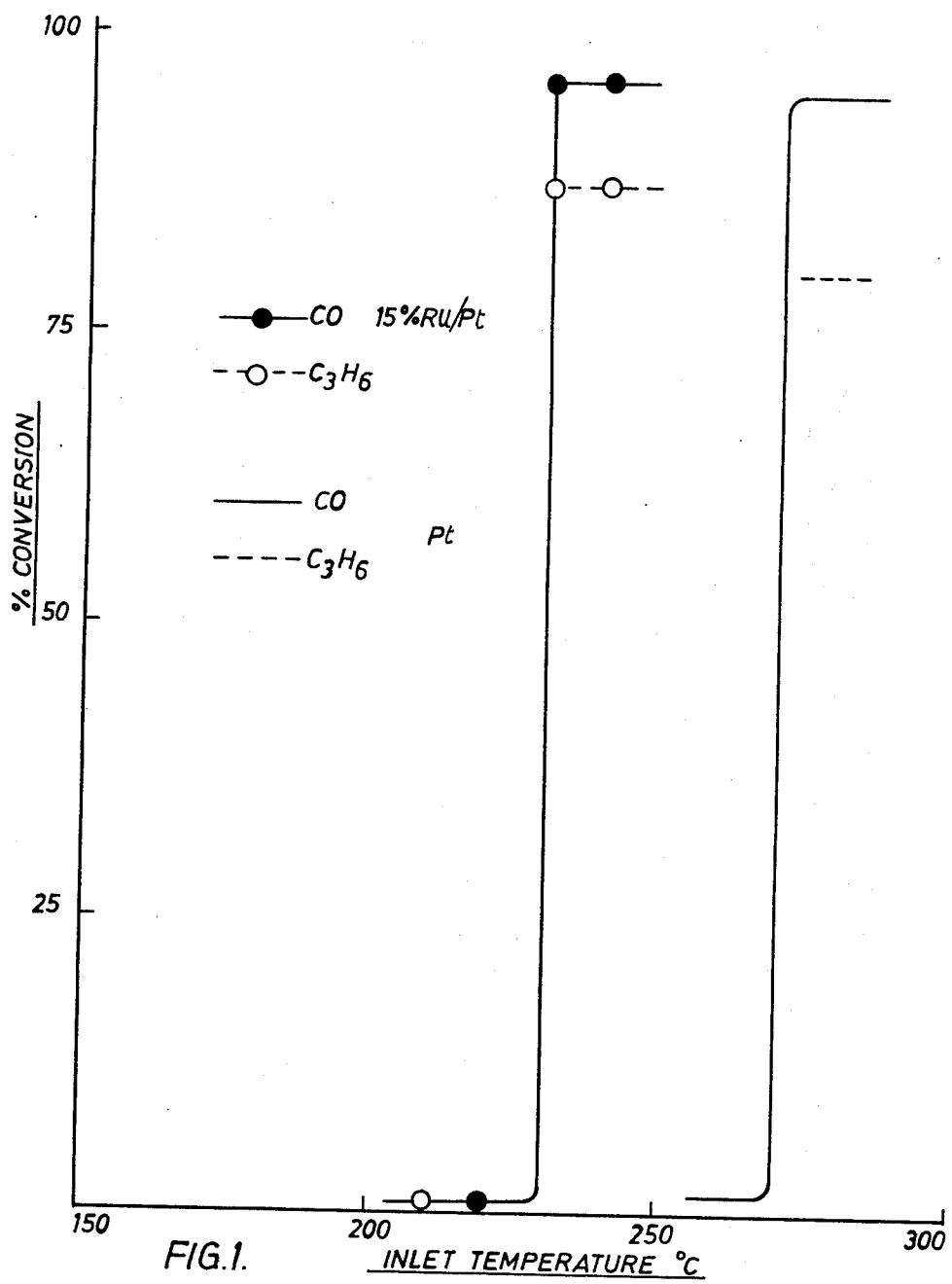

United States Patent [19]

Acres et al.

[11] 3,963,827

[45] June 15, 1976

[54] CATALYSIS

[75] Inventors: Gary James Keith Acres; Barry John Cooper, both of London, England

[73] Assignee: Johnson, Matthey & Co., Limited, London, England

[22] Filed: Oct. 26, 1972

[21] Appl. No.: 300,980

[30] Foreign Application Priority Data
Oct. 28, 1971 United Kingdom............... 50144/71
Oct. 28, 1971 United Kingdom............... 50145/71

[52] U.S. Cl................................. 423/239; 423/247; 423/245
[51] Int. Cl.²......................................... B01D 53/34
[58] Field of Search ........... 423/212, 213, 214, 239, 423/245, 247

[56] References Cited
UNITED STATES PATENTS

| | | | |
|---|---|---|---|
| 2,330,664 | 9/1943 | Bennet et al..................... | 423/214 X |
| 3,230,034 | 1/1966 | Stiles................................. | 423/214 |
| 3,259,453 | 7/1956 | Stiles................................. | 423/214 X |
| 3,370,914 | 2/1968 | Gross et al......................... | 423/213 |
| 3,397,154 | 8/1968 | Talsma............................. | 423/213 X |
| 3,502,596 | 3/1970 | Sowards............................. | 423/477 |
| 3,554,929 | 1/1971 | Aarons........................ | 423/213.5 X |
| 3,637,344 | 1/1971 | Thompson ......................... | 423/214 |
| 3,784,875 | 1/1974 | Kobylinski et al.............. | 423/213.5 |

FOREIGN PATENTS OR APPLICATIONS

| | | | |
|---|---|---|---|
| 602,460 | 12/1951 | United Kingdom................. | 423/239 |
| 972,683 | 10/1964 | United Kingdom................. | 423/213 |

*Primary Examiner*—G. O. Peters
*Attorney, Agent, or Firm*—Cushman, Darby & Cushman

[57] ABSTRACT

This invention relates to a catalyst suitable for use in the process of a) the reduction of an oxide of nitrogen present in a gas containing nitrogen, and b) for the oxidation of carbon monoxide or one or more organic compounds present in a gas. The catalyst comprises an inert material impregnated or coated with a mixture or alloy comprising 5–75 weight % ruthenium, optionally 0–30 weight % base metal and balance platinum in an amount not less than 5 weight %.

37 Claims, 22 Drawing Figures

FIG. 4. WINDOW AT 80% CONVERSION = 0.83% O₂

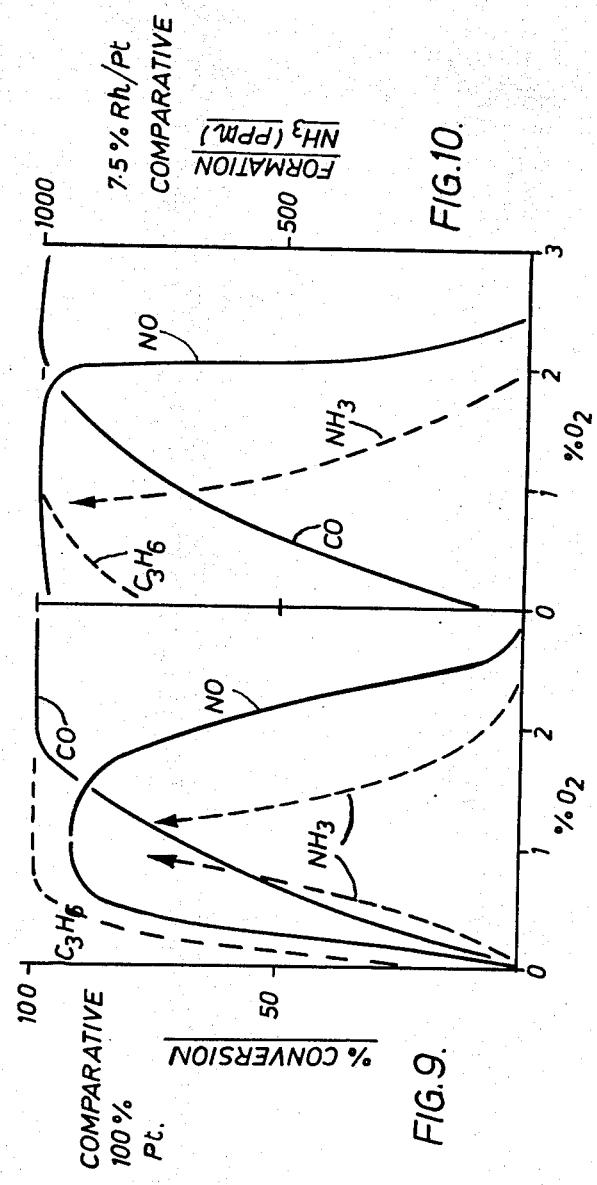

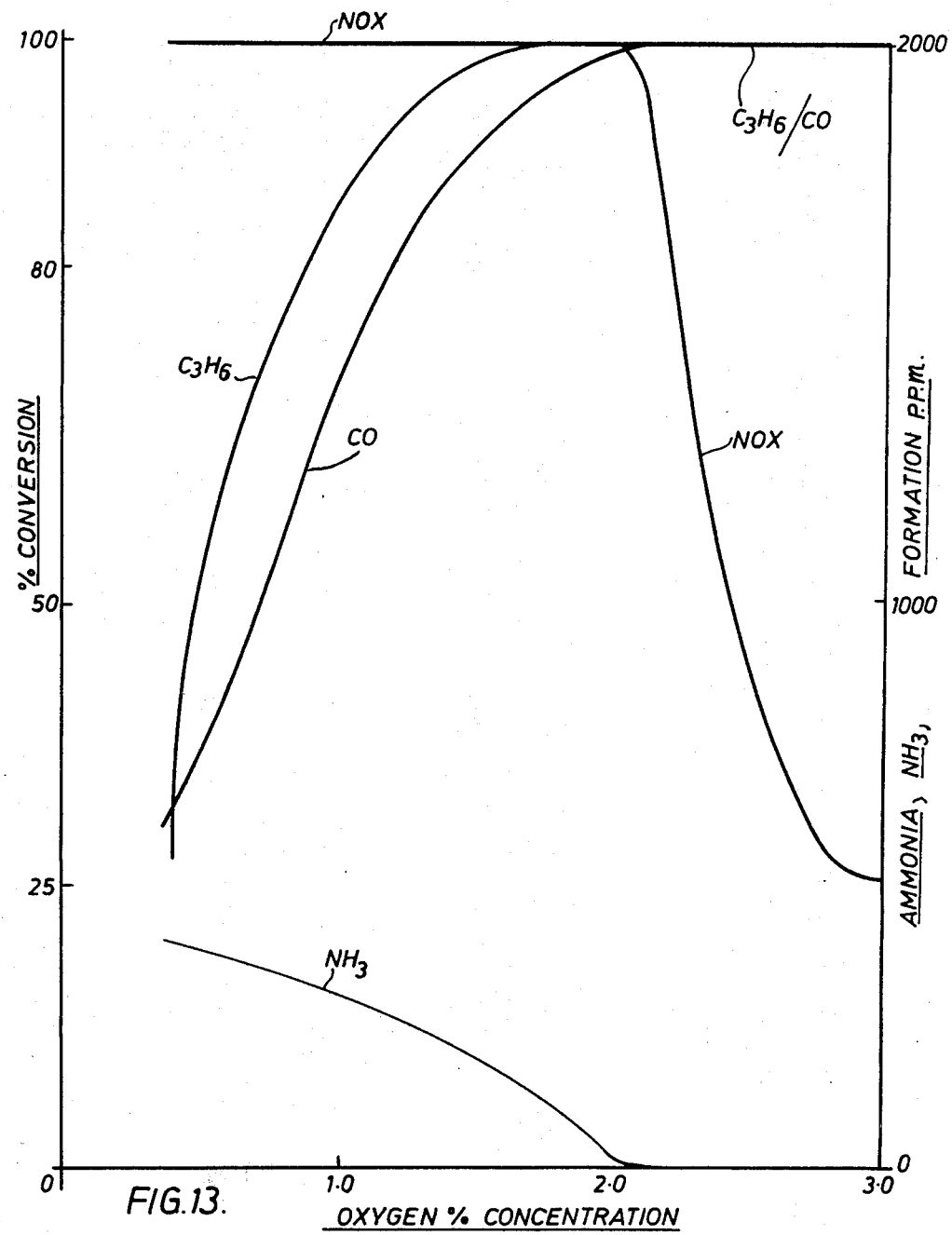

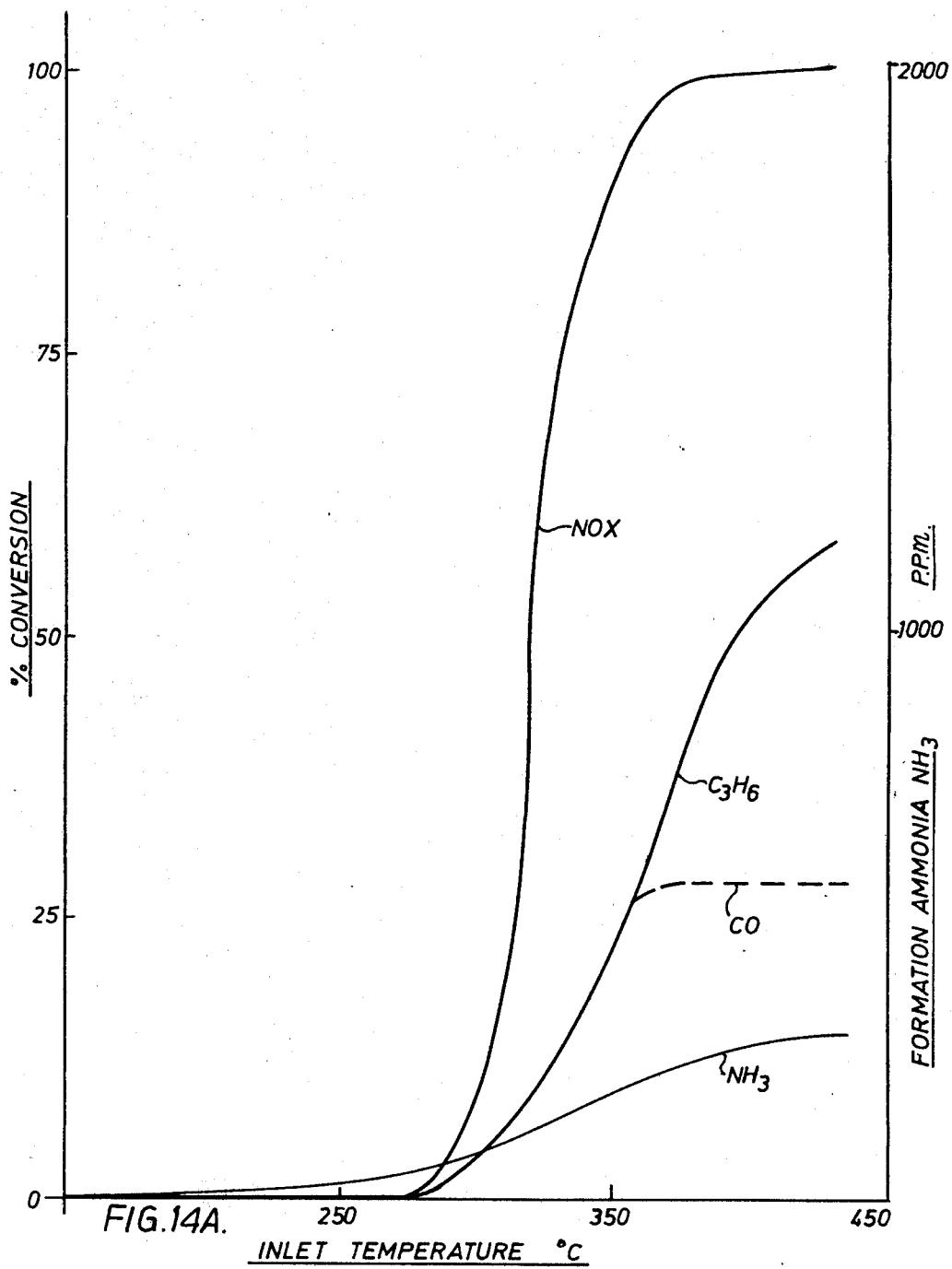

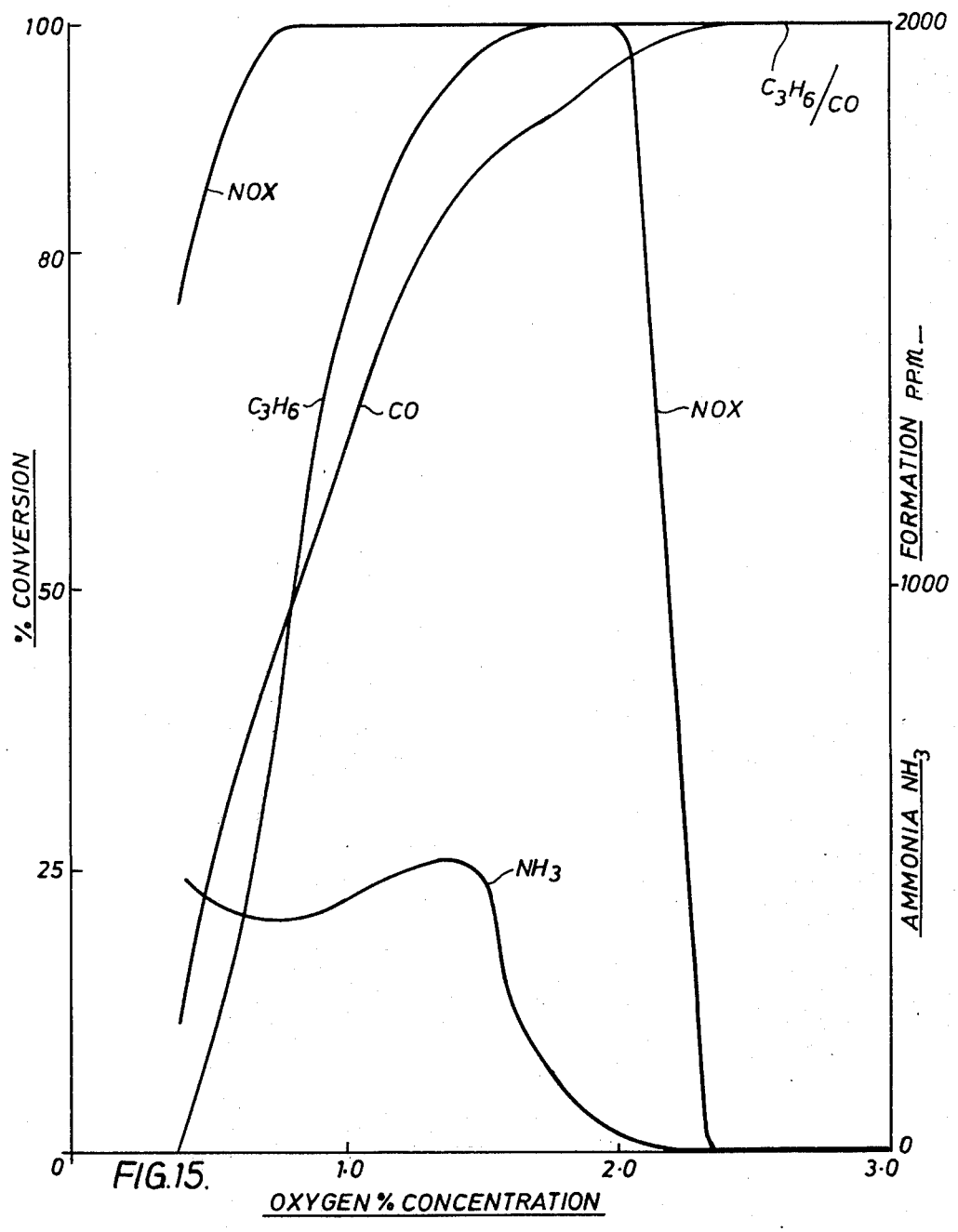

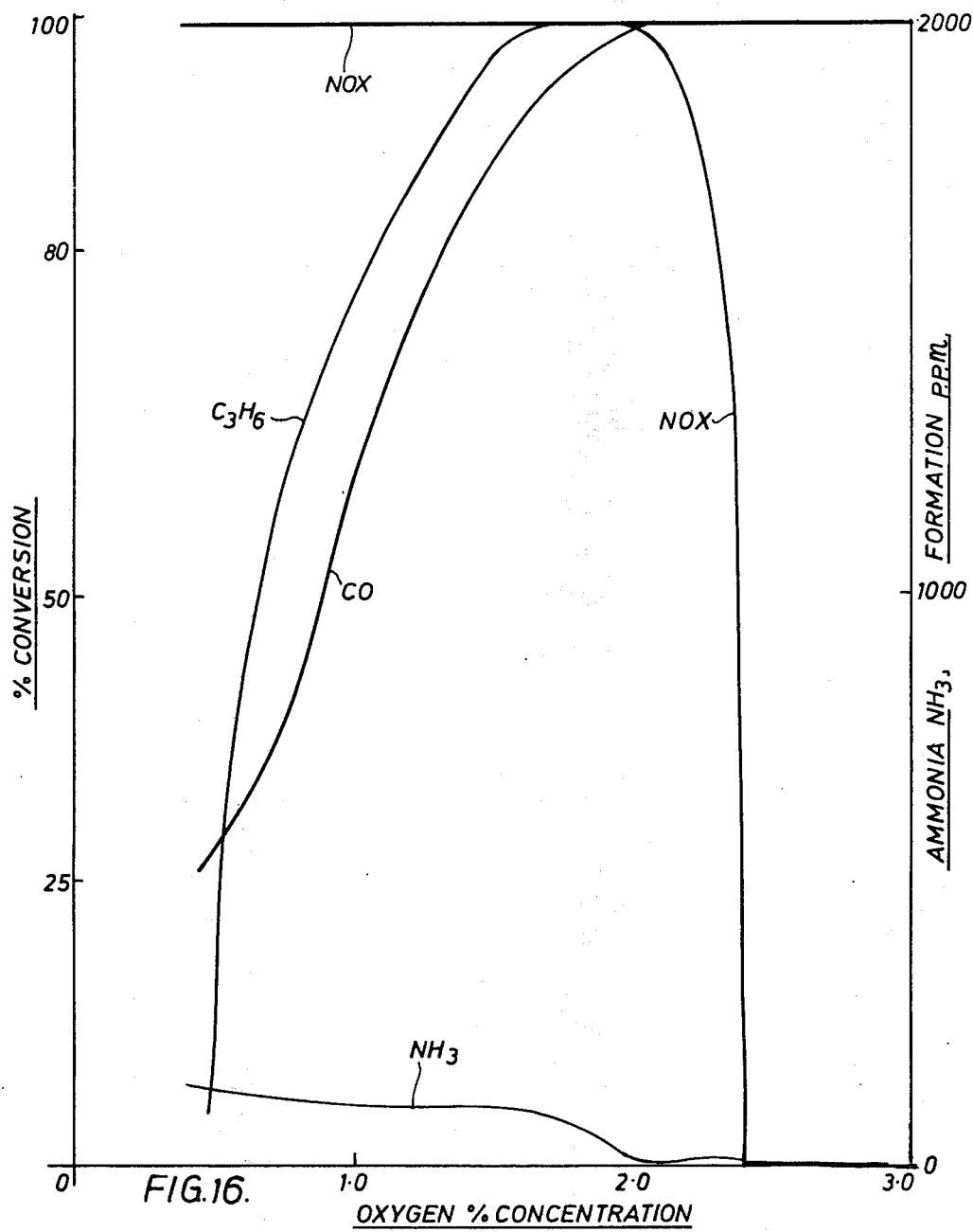

CATALYSIS

This invention relates to catalysts for catalytically oxidizing organic compounds (for example methane, ethane, propylene and carbon monoxide), catalytically reducing oxides of nitrogen with a reducing fuel and to catalysts for use in the production of methane by the steam reforming of naphtha and naphtha distillates.

Methane, primarily as a result of its relative cheapness and its presence in natural gas is being used increasingly as a reducing fuel and may be oxidised in a number of industrially important processes.

Unburnt hydrocarbons, partially oxidised hydrocarbons, oxides of nitrogen and carbon monoxide contained in the exhaust gases from internal combustion engines in addition to a wide variety of other organic compounds produced by well established processes in the chemical industry, present serious problems of atmospheric contamination. For example, the oxide of nitrogen which is present in diesel exhaust gases is mainly nitric oxide. This is produced during the combustion of diesel fuel by the combination of nitrogen and oxygen at the high temperatures and pressures present in a combustion chamber. The presence of nitric oxide in the exhaust gases is particularly hazardous when the engine is used in a confined space.

Any engine operating parameter that reduces the combustion temperature will reduce the nitric oxide concentration. For example, retarding the engine, increasing the fuel concentration, reducing the compression ratio, reducing the maximum power output of the engine, and recycling the exahust gases all lead to a reduction in nitric oxide levels.

Unfortunately, a number of these modifications which reduce nitric oxide levels also increase the CO and hydrocarbon content of the exhaust gases and therefore cannot be used without an exhaust gas purification unit.

Hitherto it has, therefore, been considered necessary to use a two-stage catalyst purification unit. In the first stage thereof the presence of excess hydrocarbon fuel components reduces the oxides of nitrogen to nitrogen and water and in the second stage thereof additional oxygen is supplied in the form of an air intake, so as to oxidise the remaining hydrocarbon and carbon monoxide components to carbon dioxide and water.

Such a two-stage catalyst purification unit is not only expensive but there is also a strong tendency for the oxides of nitrogen to be reduced beyond the nitrogen-water stage to ammonia. Further, because the so-produced ammonia would be oxidized by the second stage, it is clearly out of the question to envisage any system in which the production of ammonia is either a possibility or a likelihood.

It is an object of the invention to provide a catalyst which will catalyse the reduction of oxides of nitrogen to nitrogen and water substantially without the production of any appreciable quantities of ammonia.

Catalytic combustion is a well established procedure for the elimination of many of the components present in the exhaust from a diesel engine. The catalytic system works by promoting the combustion of the carbon monoxide, hydrocarbons, aldehydes, etc., that are present in the exhaust gases with oxygen. The products of this reaction are carbon dioxide and water, which of course, are odourless and non-toxic. Unlike the petrol engine, there may be up to 20% excess air in the exhaust gases of diesel engines, which affords adequate oxygen for combustion.

As the catalytic combustion reactions are more effective the higher the exhaust temperatures, it is preferable for the catalytic unit to be installed as close to the exhaust manifold as is practical.

Generally, catalytic oxidation takes place at a much lower temperature than that required by direct combustion and, because it is a surface reaction, is less influenced by the concentration of the reactants.

For safety reasons the concentration of combustible fume in plant air streams does not exceed 25% of the lower explosion limit and cannot therefore be ignited. The fume concentrations encountered in air pollution problems may range from 1 to 1000 ppm and for combustion to take place, the fume laden air must be raised to the autogenous ignition temperature which depends upon the chemical composition of the fume. It is rarely below 500°C and may be as high as 1000°C for complete combustion.

The cost of the fuel required to achieve these temperatures is frequently prohibitive and, in some cases, higher than the operating cost of the process generating the fume. Therefore, athough combustion is an attractive method of destroying organic pollutants because it is continuous and produces no effluent, a means of reducing the reaction temperature is required to make the process more economic.

Hydrocarbons such as methane and ethane and other organic components emitted in the exhausts of diesel engines under medium or high load conditions require relatively high catalyst temperatures before reaction occurs. Thus, the provision of a catalyst which was active for methane and the lower hydrocarbons at substantially lower reaction temperatures would constitute a substantial advance over the existing processes. Similarly, the use of a supported catalytic metal for air pollution abatement (frequently known as "NOX abatement") the most difficult fuel to use is methane as it requires high catalyst temperatures before the reaction occurs. Methane is, however, one of the cheapest fuels available and if a catalyst could be made which was active for methane at substantially lower reaction temperatures, it would also constitute a substantial advance over the existing processes.

Production of nitric acid by the oxidation of ammonia normally results in a tail or waste gas containing noxious NO and $NO_2$. The presence of oxides of nitrogen in the tail gases results from the incomplete conversion of the nitrogen oxides to nitric acid and, the noxious oxides of nitrogen are usually discharged into the atmosphere. The discharge of these oxides of nitrogen into the atmosphere is undesirable since they are corrosive and present risk of injury to both vegetable and animal life.

The tail gas from nitric acid plants wherein ammonia is oxidised typically contains, by volume, from 0.1 to 0.5 per cent of NO, trace to 0.3 per cent of $NO_2$, from 2 to 5 per cent of $O_2$ and the balance inert constituents, for example, nitrogen and argon. Additionally $N_2O$ may also be present in amount of from a trace to 1 per cent by volume and also water vapour in amount up to 5 per cent by volume.

For "NOX" (that is, oxides of nitrogen) abatement, it is desirable to remove all or substantially all of the nitrogen oxides before venting the tail gas to the atmosphere. However, in known processes there is a tendency under certain conditions for some of the oxide of nitrogen to be reduced back to ammonia by the catalyst. It is an object of the present invention to enable purification of tail gases to be obtained without the formation of ammonia. In a purification process involving the catalytic reduction of oxides of nitrogen, a reducing fuel (e.g. $H_2$, CO), a normally gaseous hydrocarbon (namely methane or natural gas, or other hydrocarbon gases of liquids) are injected into the stream of tail gas and reacted with the nitrogen oxides in the stream. When the fuel stoichiometrically exceeds the nitrogen oxides and oxygen, the nitrogen oxides are reduced to exceedingly low concentrations. Because of the large gas flow involved in the manufacture of nitric acid (typically about 1 million standard cubic feet of gas per hour in a plant having a nitric acid production of 240 tons per day) the catalysts are required to have a high level of activity and the reactors are required to be capable of handling large gas flows.

Many nitric acid plants use high pressure processes in the ammonia oxidation step, and it is highly advantageous to recover from the plant tall gas, energy which can be utilised to supply power to the system. In some systems sufficient energy can be recovered for the process to be self-sustaining and even to provide additional power. In such systems it is important the catalyst be highly active, exhibit a minimum resistance to gas flow and catalyse the reaction at low initial reaction or ignition temperatures.

The catalyst itself, should however, still have reasonably high (750°-800°C) temperature stability. Equivalent problems are associated with the use of natural gas (which is mostly methane but includes a certain amount of $H_2$).

Important advantages of low ignition temperature are:

a. better fuel conversion efficiency and lower running costs (that is, in those cases where the organic effluent is being used as a fuel);

b. a higher percentage removal of noxious gases escaping into the atmosphere;

c. smaller heat exchangers and a cheaper reactor system may be used; and d. it makes possible the use of a single catalyst bed instead of a dual or other more complicated system.

It is another object of this invention to provide a process whereby ignition of organic contaminants may take place at a relatively low temperature, thus enabling them to be more completely removed from an effluent gas escaping into the atmosphere.

Air pollution control by catalytic combustion imposes a number of restrictions on the type of catalyst which may be used. In addition to a requirement that the catalyst should be active at low temperatures, it should be stable under both oxidising and reducing conditions. The catalyst when packed into a reactor should have a very low pressure drop across the bed and it should be resistant to attrition, thermal shock and clogging by dust particles.

Hitherto platinum has been the preferred catalyst for air pollution control. In the conventionally supported form, platinum is more active than base metal catalysts, it is stable up to at least 750°C and is resistant to poisoning by most elements except lead and phosphorus. supported platinum has been used in pelleted form but pressure drop problems through the catalyst bed and attrition between the individual catalyst pellets (which causes dusting and loss of precious metal) impose severe limitations on the design of the catalyst reactor.

The concentration of organic compounds in the fume is also important. In most cases, the concentration does not significantly affect the ignition temperature. A notable exception, however, is methane. The concentration of the fume and its composition does, however, determine the amount of oxygen that will be consumed and the temperature rise that will occur on the catalyst. This may be calculated and used in the design of the abatement plant. Where it is significant, the heat generated may sustain the oxidation or be recycled to maintain the temperature of the process gas.

The temperature of the gas steam containing the fume to a large extent determines the design of the plant required for pollution control. When the temperature is above that required for ignition, the catalyst may be placed directly in the gas stream. Examples of this use are wire-enamelling ovens, some paint-drying ovens, self-cleaning cookers and diesel or internal combustion engine exhaust systems.

According to one aspect of the present invention a process for the reduction of an oxide of nitrogen present in a gas includes passing at an elevated temperature, the gas together with a gaseous fuel through a supported catalyst comprising an inert material impregnated or coated with a mixture or alloy comprising (apart from impurities) 5 to 75 wt% ruthenium, optionally 0 to 30 wt% base metal and balance platinum in an amount not less than 5 wt%.

According to a second aspect of the present invention a process for the oxidation of carbon monoxide or one or more organic compounds present in a gas includes passing, at elevated temperature, the gas together with oxygen through a supported catalyst comprising an inert material impregnated or coated with a mixture or alloy comprising, apart from impurities, 5 to 75 wt% ruthenium, optionally 0 to 30 wt% base metal and balance platinum in an amount not less than 5 wt%.

According to a third aspect of this invention, a catalyst for use in oxidation or reduction reactions comprises an inert material impregnated or coated with a mixture or alloy comprising, apart from impurities, 5 to 75 wt% ruthenium, optionally 0 to 30 wt% base metal and balance platinum in an amount not less than 5 wt%.

The mixture or alloy may contain 0 to 20 wt% base metal. If desired, the mixture or alloy may contain 5 – 65 wt% ruthenium. Other compositions of the mixture or alloy suitable for carrying the present invention into effect include:

a. 5 – 15 wt% platinum, a trace of 30 wt% base metal and 5 – 75 wt% ruthenium;

b. 5 – 10 wt% ruthenium, a trace to 30 wt% base metal and balance not less than 5 wt% platinum; and c. 75 – 95 wt% platinum, trace to 20 wt% base metal and balance not less than 5 wt% ruthenium.

By "elevated temperature" we mean a temperature sufficient for catalytic oxidation of a significant quantity of the organic compound or catalytic reduction of a significant quantity of the oxide of nitrogen etc., to occur as a result of contact with the catalysts of the invention. For example, in the case of producing methane by reforming naphtha, the "elevated temperature" is 900°C. In the oxidation of organic compounds, e.g. benzene, carbon monoxide and propylene, the elevated temperatures are 180°C, 150°C and 200°C respectively.

Preferably the inert material has applied thereto a first coating, layer or deposit of a refractory oxide. The first coating, layer or deposit is, thereafter, preferably coated or impregnated with the mixture or alloy of platinum, rutherium and base metal as specified above. Alternatively, the material forming the first coating, layer or deposit may be pre-coated or pre-impregnated with the said mixture or alloy as specified, prior to application thereof to the inert material.

The inert material may be pre-coated or pre-impregnated with a refractory metal oxide which is itself then coated or impregnated with the mixture or alloy of platinum, ruthenium and base metal component as specified above.

The pre-coating or pre-impregnating oxide may be one or more of the oxides of the metals of Group IIIA (that is scandium, yttrium and the lanthanides) as the simple oxide or in bound form when ion-exchanged on to a molecular sieve such as a zeolite. The Group IIIA metal oxide may constitute any proportion by weight of the total intermediate high surface area refractory metal oxide coating up to and including 100%. Preferably, however, it is present in proportion from about 5 to 20% by weight, the remainder being constituted by one or more of, e.g. alumina, magnesia, silica, beryllia, boria-alumina, silica-alumina, etc.

If, for example, a neodymium exchanged type 13X molecular sieve zeolite (sold by Union Carbide Corporation) is to be used as constituting 10% by weight of the intermediate coating we would prepare this by suspending 100 grams of the sodium form of the zeolite in 500 c.c. of an approximately 5% by weight solution of neodymium nitrate hexahydrate $Nd(NO_3)_3 6H_2O$ also containing approximately 2% by weight of ammonium nitrate. This mixture would be refluxed at 80°–90°C for 18 hours, washed, dried and fired at 500°C for 2 hours. The whole process would then be repeated and would produce a zeolite in which all the sodium had been exchanged for neodymium. The pre-coating oxide may be in the form of a continuous or discontinuous film of from 0.0004 to 0.01 inch thick.

Conveniently, the said mixture or alloy contains from 5 to 45 wt% and preferably 35 wt% ruthenium considered relative to the total metal in the mixture or alloy. The base metal component may be present in an amount of 5 – 30 wt%, preferably 5 – 20% by weight of the total metal component present.

A further catalyst according to this invention, therefore, comprises an inert rigid porous refractory honeycomb structure coated with a mixture or alloy of platinum, ruthenium and optionally base metal, the mixture or alloy containing from 5 to 65 wt% ruthenium and from 0 to 30 wt% base metal considered relative to the total metal content.

Preferably the refractory honeycomb structure has depositied thereon a first coating of a refractory metal oxide which is further impregnated or coated with the said mixture or alloy of platinum, ruthenium and base metals.

According to another aspect of this invention, a process for the reduction with a reducing fuel of an oxide of nitrogen or the oxidation of an organic compound from a gas also containing oxygen comprises passing the gas mixture at an elevated temperature through a supported catalyst comprising an inert material coated with a mixture or alloy of platinum, ruthenium and optionally base metal in which the ruthenium comprises from 5 to 65 wt% and the base metal from 0 to 30 wt% of the total metal content.

According to another aspect of the present invention, a process for the oxidation of carbon monoxide or an organic compound in a gas containing oxygen comprises passing the gas at an elevated temperature through a supported catalyst comprising an inert material coated with a mixture or alloy of platinum, ruthenium and optionally base metal in which ruthenium comprises from 5 to 65 wt% and the base metal from 0 to 30 wt% of the total metal content.

According to another aspect of this invention a method of catalytic oxidation of carbon monoxide and one or more organic compounds present in a gas stream comprises the steps of contacting the gas stream together with oxygen at an elevated temperature with a supported catalyst comprising a support formed from an inert unitary porous refractory ceramic honeycomb material coated with a mixture or alloy containing 5 – 65 wt% ruthenium, 0 – 30 wt% of a base metal and balance platinum.

The invention also includes a catalyst comprising a support formed from an inert unitary porous refractory ceramic honeycomb material and a coating of a mixture or alloy containing 5 – 65 wt% ruthenium, 0 – 30 wt% of a base metal and balance platinum.

According to another aspect of this invention a process for the removal from a gas of an oxide of nitrogen comprises passing at elevated temperature the gas together with a gaseous reducing fuel through a supported catalyst comprising an inert unitary porous refractory ceramic honeycomb material impregnated or coated with a mixture or alloy of platinum, ruthenium and optionally base metal in which the ruthenium constitutes from 5 – 65 wt% and the base metal constitutes from 0 to 30 wt% of the total metal content. Preferably also, the gaseous reducing fuel contains methane as a major component and preferably ruthenium comprises from 10 – 60 wt% and, even more preferably, about 35 wt% of the total metal in the mixture or alloy.

The invention also includes a catalyst comprising an inert unitary porous refractory ceramic honeycomb material impregnated or coated with a mixture or alloy of platinum, ruthenium and optionally base metal in which ruthenium constitutes from 5 – 65 wt% and the base metal constitutes from 0 – 30 wt% of the total metal content.

Conveniently the gas to be processed is in the form of a stream.

The following characteristics have been found to be suitable in the working of the invention, but are not, of course, obligatory.

The inert structure used in the process of the present invention and on which the refractory metal oxide is deposited is preferably an inert unitary rigid honeycomb structure or block having a plurality of pores or channels therethrough extending in the direction of gas flow. The structure will usually occupy nearly all of the cross-sectional area of the reaction zone available with a packing between the structure and the reactor walls so as to prevent by-passing of the structure by any part of the gas stream. Alternatively, the inert structure may be of corrugated cellular form.

The inert material used in the present invention, on which the refractory metal oxide is coated may be any refractory compound which is unreactive with the coating and which can be prepared in a form which has a high surface area. It is preferably also unreactive with any of the gaseous constituents present in the operation of the process. Oxides, or mixtures of oxides, of one or more of the following elements may be used as the inert material ultimate support: magnesium, calcium, strontium, barium, aluminium, scandium, yttrium the lanthanides, the actinides, gallium, indium, thallium, silicon, titanium, zirconium, hafnium, thorium, germanium, tin, lead, vanadium, niobium, tantalum, chromium, molybdenum, tungsten, and uranium. Compounds such as the carbides, borides and silicides of the transition metals may also be used. Other suitable ceramic materials which may be used are zircon-mullite, mullite, alpha alumina, sillimanite, magnesium silicates, zircon, petalite, spodumene, cordierite and alumino-silicates. Suitable proprietary products are "MATTECEL" (Trade Name) supplied by Matthey Bishop Inc., "TORVEX" (Registered Trade Mark) sold by E.I. Du Pont de Nemours & Co., "W1" (Trade Name) sold by Corning Glass and "THERMACOMB" (Registered Trade Mark) sold by the American Lava Corporation. Another useful product is described in British Patent No. 882,484.

The refractory metal oxide is deposited on the support (either continuously or discontinuously) and preferably the deposit is in the form of a film of from 0.0004 to 0.001 inch thick.

Such an oxide is a calcined refractory metal oxide which itself is characterised by a porous structure and which possesses a large internal pore volume and total surface area and is therefore referred to as an "active" (that is catalytically active) refractory metal oxide.

The preferred active refractory metal oxides contain members of the gamma or activated alumina family which can be prepared for instance, by precipitating a hydrous alumina gel and, thereafter, drying and calcining to expel hydrated water and provide the active gamma-alumina. A particularly preferred active refractory metal oxide is obtained by drying and calcining at temperatures of 300°C to 800°C a precursor mixture of hydrous alumina phases predominating in crystalline trihydrate, that is, containing in excess of 50% by weight of the total alumina hydrate composition, preferably from 65 to 95% by weight of one or more of the trihydrate forms gibbsite, bayerite and nordstrandite by X-ray diffraction.

Other suitable active refractory metal oxides include for example, active or calcined beryllia, zirconia, magnesia or silica, and combination of metal oxides such as boria-alumina or silica-alumina. Preferably the active refractory oxide is composed predominantly or oxides of one or more metals of Groups II, III and IV of the Periodic Table. The active refractory metal oxide deposit may constitute from 1 to 50 wt% of the unitary support, preferably from 5 to 30 wt%.

The support may be provided with a deposit of the active refractory metal oxide of the present invention, to be deposited on the support in several ways. One method involves dipping the support into a solution of the salt of the refractory metal and calcining to decompose the salt to the oxide form. Another and preferred method comprises dipping the support into an aqueous suspension, dispersion or slurry of the refractory oxide itself, drying and calcining. In the latter method, suspensions or dispersions having a solids content of from 10 to 70% by weight can be used to deposit a suitable amount of a refractory metal oxide on the support in a single application. In order to prepare a catalyst having 10% by weight of activated alumina on a zircon-mullite structure, from 20 to 40% by weight of solids is used in the suspension. The percentage of the solids present is determined on an ignited weight basis (ignited at 1100°C). A particularly preferred method involves forming an aqueous dispersion or slurry as just described and subjecting the mixture to a wet grinding or milling operation whereby the refractory metal oxide is reduced to a finely divided form and a thixotropic slip obtained, having the desired consistency, e.g. a solids content of 10 to 70% by weight. The support is then dipped into the slip, dried and calcined. In general, calcining temperatures of from 150° to 800°C are employed. The calcination is favourably conducted in air, for example flowing dried air, or may be carried out in contact with other gases such as oxygen, nitrogen, or flue gas, or under vacuum conditions. The refractory oxide is deposited on the surfaces of the structure including the channel surfaces and superficial macropores in communication with the channel surfaces as thin deposits in a weight ratio of from 1 to 50% and preferably from 5 to 30% relative to the weight of the block.

In an alternative embodiment of the present invention, a second intermediate support may also be used. For example, the oxide of zirconium may be deposited upon particles of alumina, and the so-coated particles may then themselves be deposited upon the inert ultimate support material which may also, for example, be made of alumina. Alternatively it could also be a honeycomb composed of any one of the ceramic materials detailed above. In this way, it is possible to produce a catalyst which presents a very much larger surface area of catalytically active metal to the reacting gases. It will be appreciated that more than one intermediate support may be utilized, depending upon the relative sizes of each of the particles involved. It is, however, not usually necessary to employ more than two intermediate coatings. For example the structure of the catalyst could be as follows:

a. ultimate inert support material in ceramic honeycomb form;
b. particles of second inert material (which may be, but is not necessarily, the same as the first inert material) coated with
c. one or more refractory metal oxides;
d. catalytically active metal layer comprising a platinum-ruthenium mixture or alloy, also containing up to 30% by weight of a base metal.

Known metals may be used for preparing structures of this type.

Impregnation with the mixture or alloy of platinum, ruthenium and optionally base metal may be accomplished by known methods of deposition of catalytically active metals on supports. For example, if a ceramic honeycomb structure is used with a high surface are deposit of alumina deposited thereon, the support may be immersed in a solution of water soluble inorganic salt or salts of the platinum, ruthenium and base metal such as (for example) chloro-platinic acid, ruthenium trichloride and nickel chloride, agitating the mixture to ensure uniform distribution, and precipitating the metals by chemical or thermal reduction or by precipitating them in a chemically combined state on the support structure. The metal is activated by conventional techniques. After impregnation with platinum, ruthenium and (optionally) base metal, the catalyst advantageously may be contacted with hydrogen sulphide to fix the platinum-ruthenium-base metal alloy or mixture in a catalytically active film of oxide as a sulphide. This also gives a more active and suitable catalyst with good dispersion of the platinum-ruthenium-base metal in a form preventing migration of the metal during drying and calcination. Alternatively, an aqueous solution of platinum, ruthenium and base metal compounds may be reacted with hydrogen sulphide to form a sol and this sol is applied to the film of intermediate refractory metal oxide. Following these treatments the completed catalyst can be calcined within the range of 150° to 800°C under conditions as previously disclosed.

It is desirable that the final catalyst has an intermediate support of refractory metal oxide in the activated or calcined state. It is also known that a ceramic catalyst carrier that has been stabilised by heating to at least 0.4 times its melting point in degrees Kelvin is very much more durable under operating conditions without any sacrifice in the activity of the catalyst. Activation of the intermediate metal oxide film may be carried out prior to depositing it upon the support, subsequent thereto and even after the platinum, ruthenium, and, if present, the base metal impregnation step. Usually such material is calcined or partially calcined before the deposition on the support. It may also be calcined after such deposition but before deposition of the platinum-ruthenium-base metal component. The catalyst containing the platinum-ruthenium-base metal mixture or alloy may be reduced by contact with molecular hydrogen at elevated temperatures before, during or after calcination.

The amount of platinum, ruthenium and, if pesent, base metal necessary will vary depending upon the particular ratio of each metal present which is selected. In all instances, however, the amount of platinum, ruthenium, and base metal compounds added will be sufficient to establish a small but catalytically effective amount of the metal in the final catalyst so as to catalyse the removal of the nitrogen oxides from the gas or, alternatively, with additional oxygen to catalyse the oxidation of the organic components (including carbon monoxide) present in the gas. In general, the total amount of catalytically active metal component may be in the range of, by weight, from 0.05 to 10% and preferably 0.5 to 2% (based on total supported catalyst structure).

Concentrations found to be satisfactory are 0.9% w/w and 1.8% w/w.

The catalysts according to the present invention when used in NOX abatement may be expected to have an active life of at least 2½ years. Whereas palladium on ceramic honeycomb catalysts exhibit acceptable ignition temperatures, they have been found to be unstable at the temperatures of operation and have been known to fail in one month. This is particularly the case when the catalytically active refractory metal oxide intermediate support is alumina. Our results indicate that 15% ruthenium 85% platinum or 35% ruthenium 65% platinum (or other combinations in which the same quantities of ruthenium are used but with some of the platinum replaced by base metal) and deposited upon an intermediate support of an oxide of aluminium, zirconium or magnesium and an ultimate ceramic honeycomb support produce catalysts according to the present invention which combine usefully low ignition temperatures with exceptionally good stability under both oxidising and reducing conditions at elevated temperatures.

It is preferred that of the catalytically active metal components present (i.e. platinum, ruthenium and base metal), ruthenium constitutes from 10 to 60% weight of the total. Percentages by weight of ruthenium which we have found to be particularly useful are 15% and 35%. It is also preferred that the combination of chemical and/or thermal methods of impregnation and reduction are such that an alloy of the metal component is formed on the surface of the support. However, not all base metal constituents will necessarily be reduced to metallic form. Compounds of chromium and tungsten, for example, are not likely to be fully reduced.

Base metal components which we have found to be particularly suitable are iron, cobalt, nickel and copper. Other base metals which have been found to be useful are molybdenum, chromium and neodymium.

The present invention includes gases which have been processed by a method or catalyst according to the invention.

EXAMPLES

A series of simulated automobile exhausts tests were carried out upon the effectiveness of various ruthenium-platinum mixtures deposited upon ceramic honeycomb supports compared with platinum alone. Effectiveness was measured on the basis of percentage conversion of the undesirable gaseous component relative to the inlet temperture into the catalyst. Ideal results are an inlet temperature as low as possible for 100% conversion. In the tests:

a. the exhaust gas had the following composition:
   CO: 4%
   $C_3H_6$: 500 p.p.m.
   NO: 2000 p.p.m.
   $O_2$: 3%
   $H_2O(g)$: 5%
   $N_2$: Balance, and
b. the pressure under which the gas was passed through a 2-inch diameter reactor containing the catalyst was 1 atmosphere and the space velocity thereof was 50,000 vv/hour.

EXAMPLE I

Figure 2:
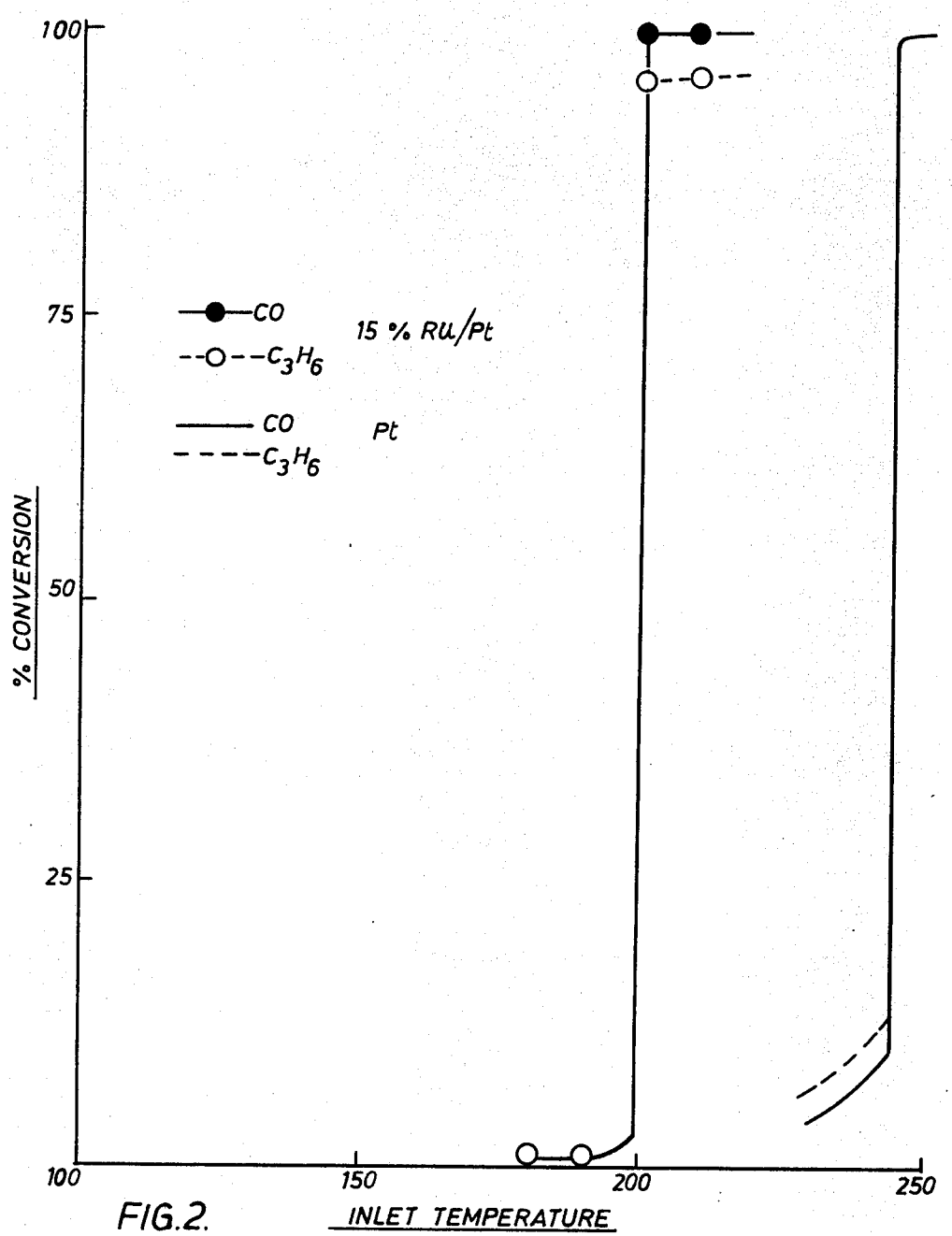

FIGS. 1 and 2 demonstrate the improvement, in the form of very much reduced inlet temperatures for almost 100% conversion, when using 15% ruthenium/platinum deposited upon two different types of ceramic honeycomb. In FIG. 2 a ceramic honeycomb having 8 corrugations or 16 holes to the inch was used and in FIG. 1 a honeycomb having 4 corrugations or 8 holes to the inch was used. In both cases the ceramic honeycomb supports had the same alumina washcoat. The lines with unplotted points represent the results for pure platinum. The lines with plotted results are 15% ruthenium/platinum alloy. It will be seen that there is almost 100% conversion, at a temperature almost 50°C lower, of carbon monoxide and propylene.

EXAMPLE II

Figure 3:
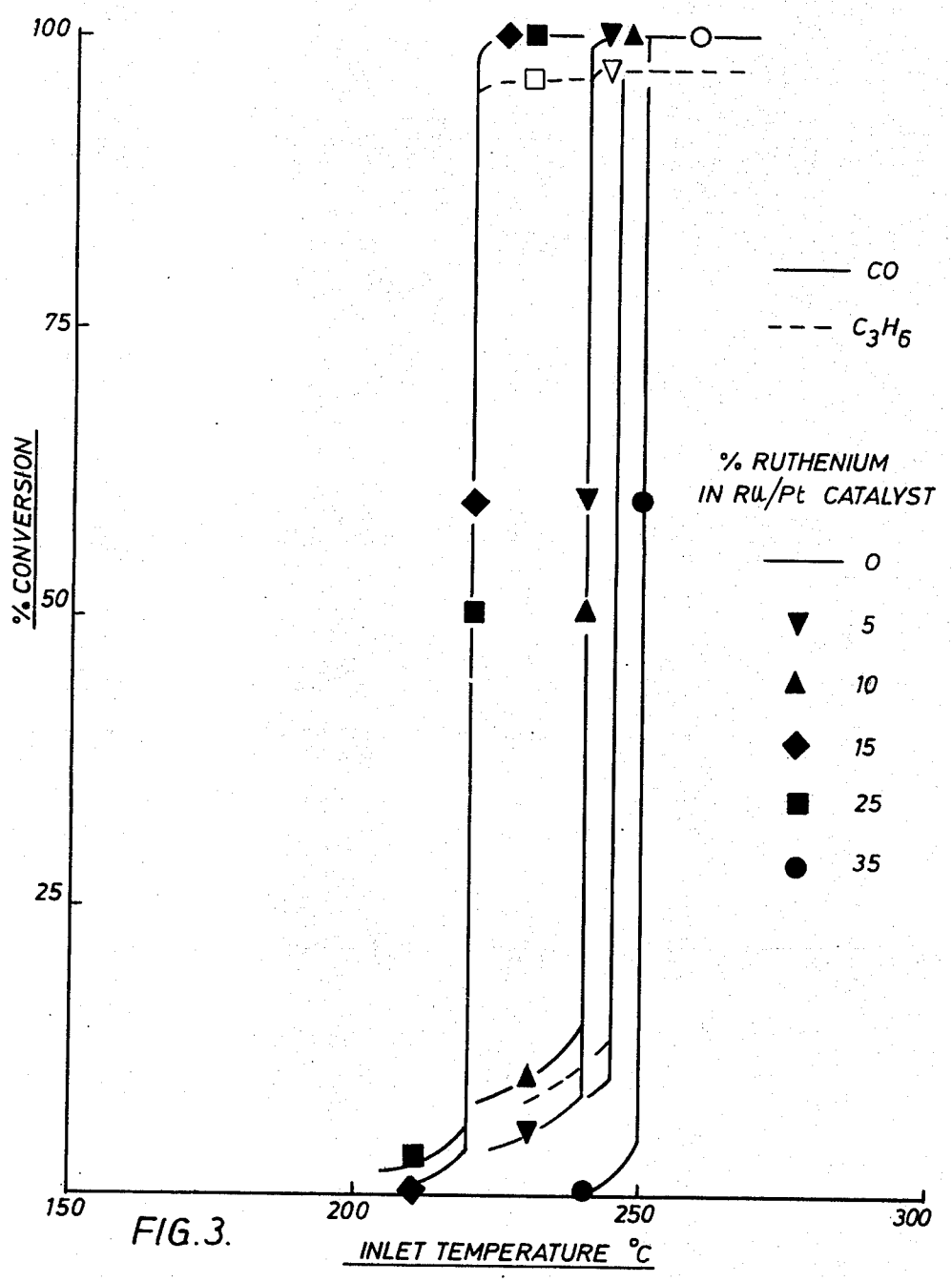

FIG. 3 shows a series of results for tests carried out in the same way as in Example I but varying the quantity of ruthenium in the ruthenium/platinum alloy from 0 to 35% by weight in steps of 5%

From FIG. 3 it can be seen that the lowest inlet temperature for almost 100% conversion and therefore the best result is given by 15 and 25% ruthenium/platinum respectively. The ceramic honeycomb support used had 8 corrugations to the inch.

EXAMPLE III

Figure 4:
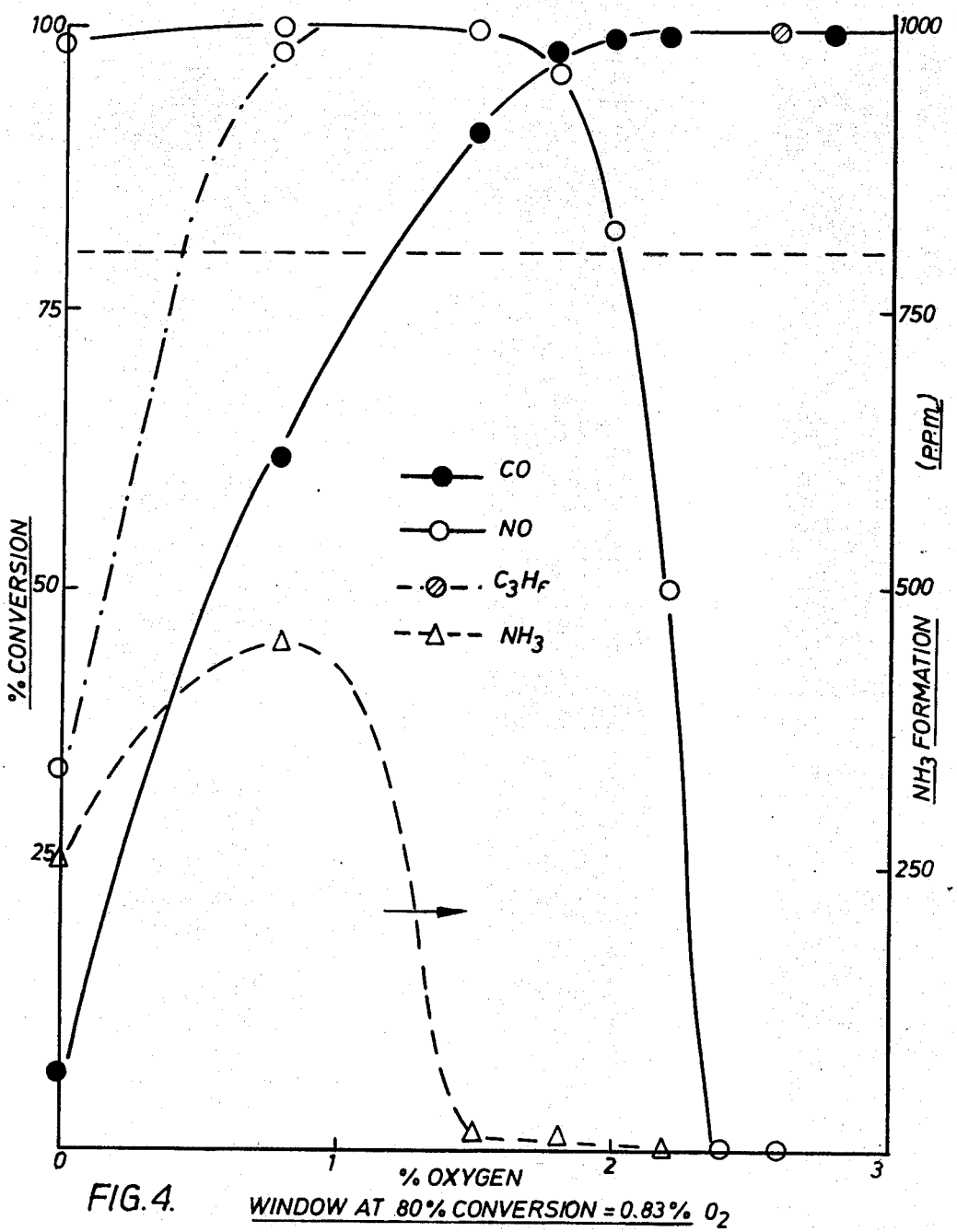
Figure 5:
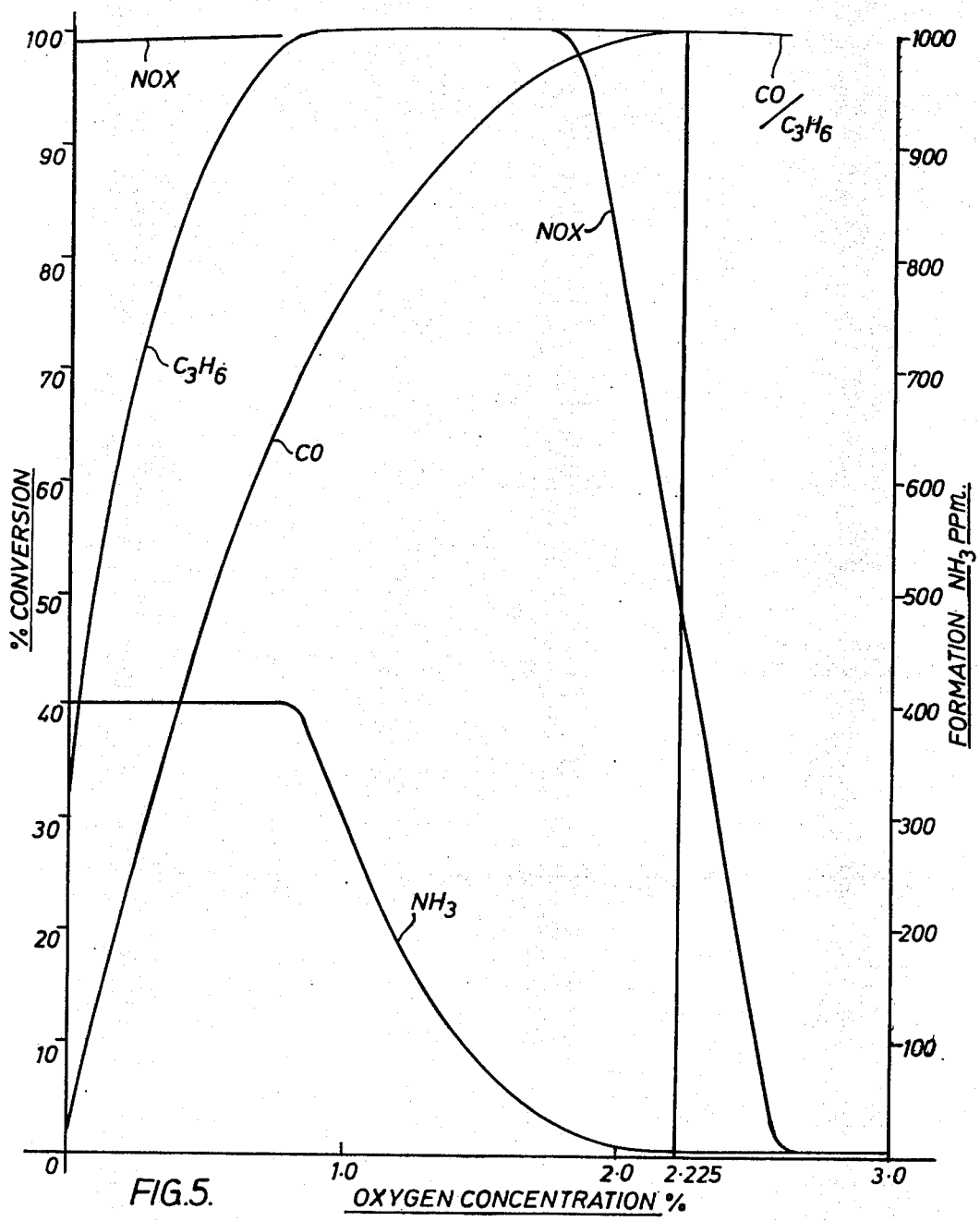
Figure 6:
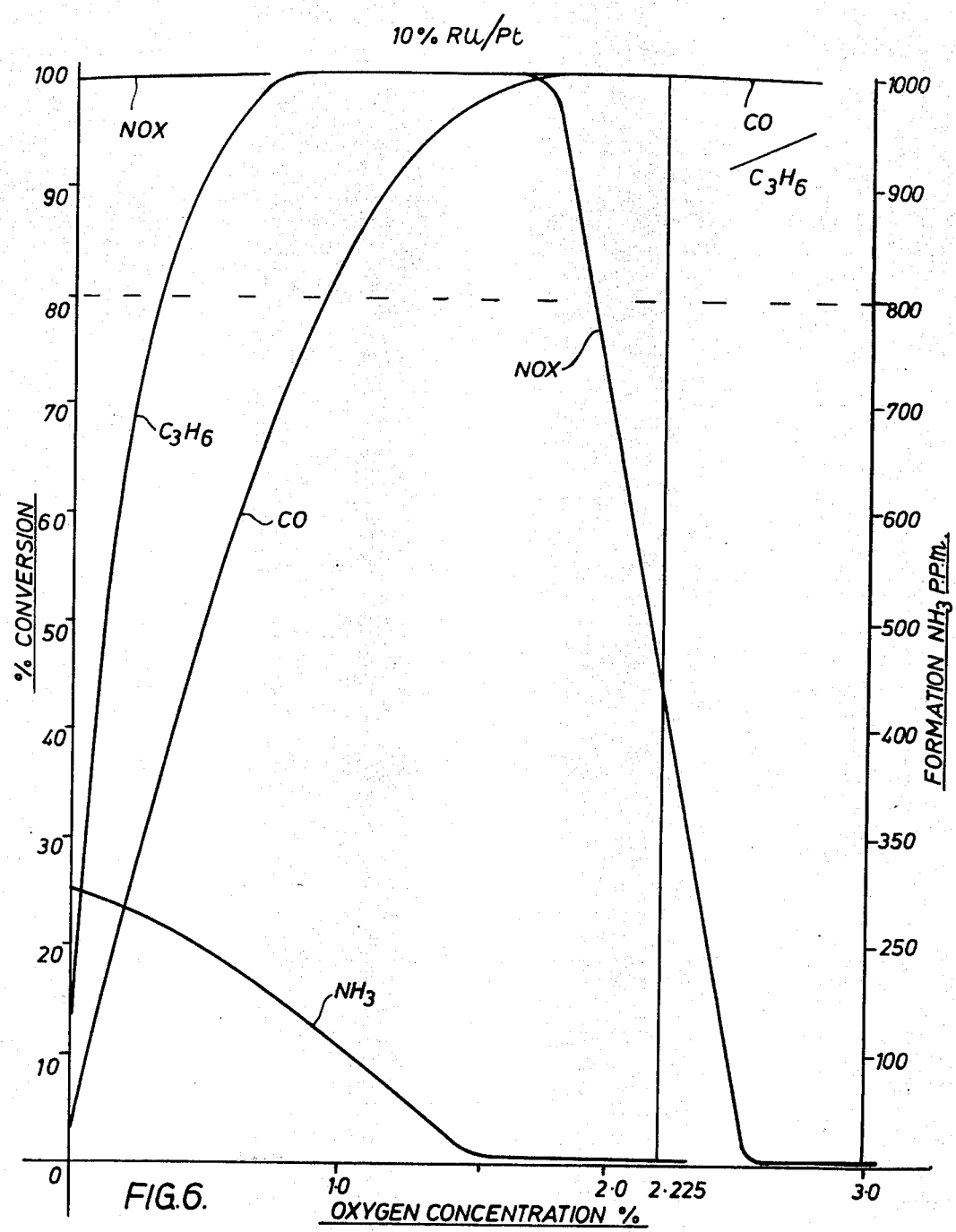
Figure 7:
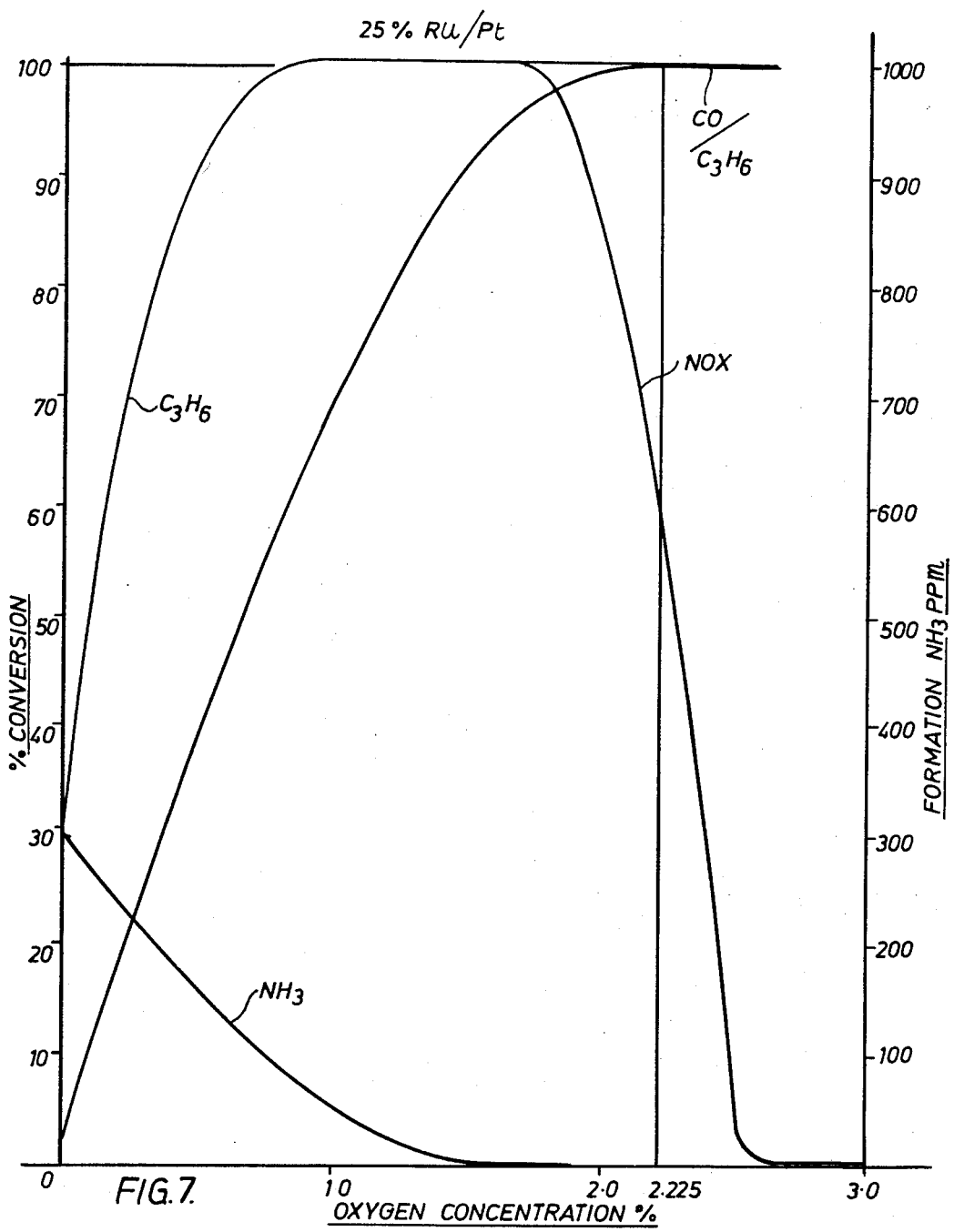
Figure 8:
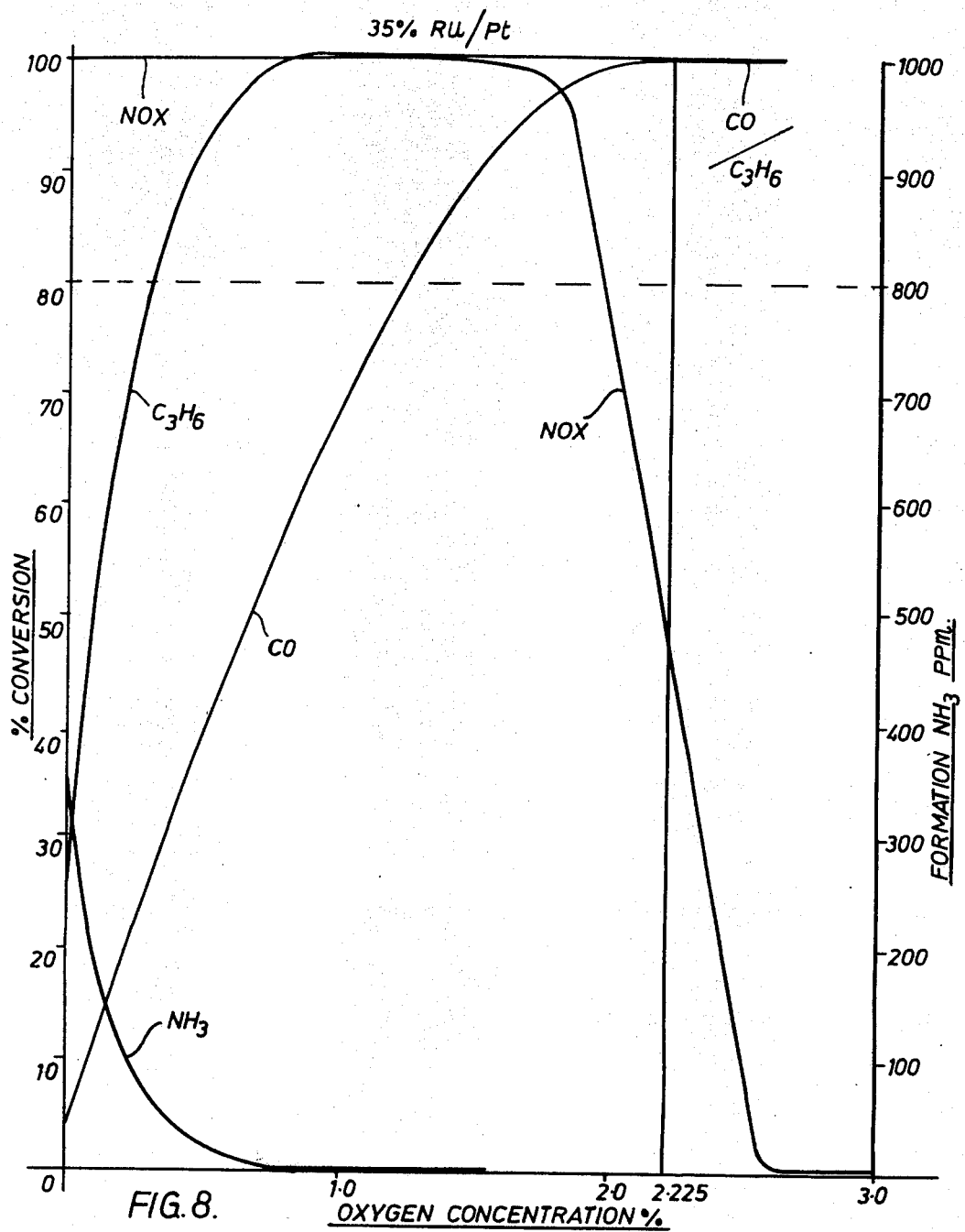
Figure 11:
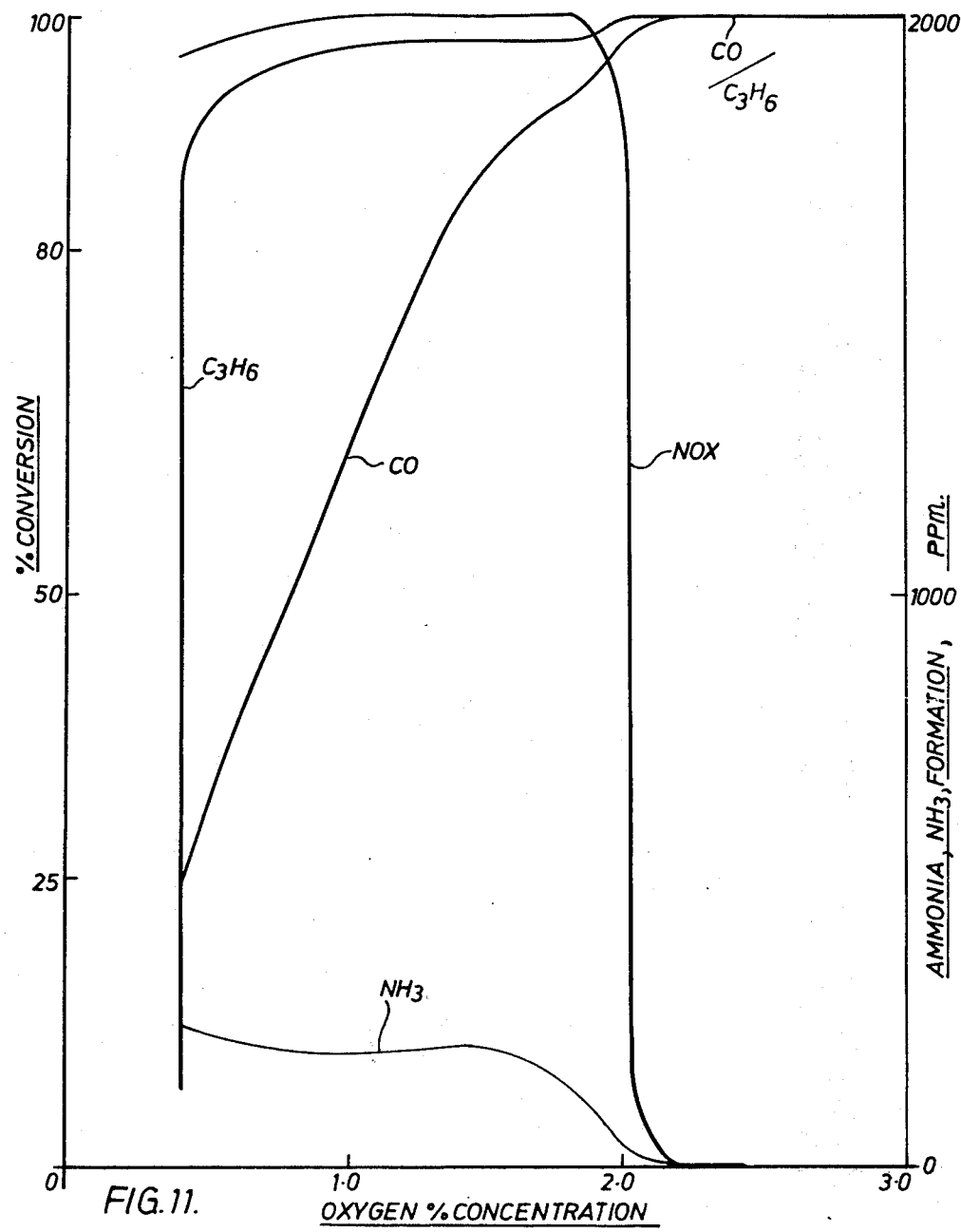
Figure 11A:
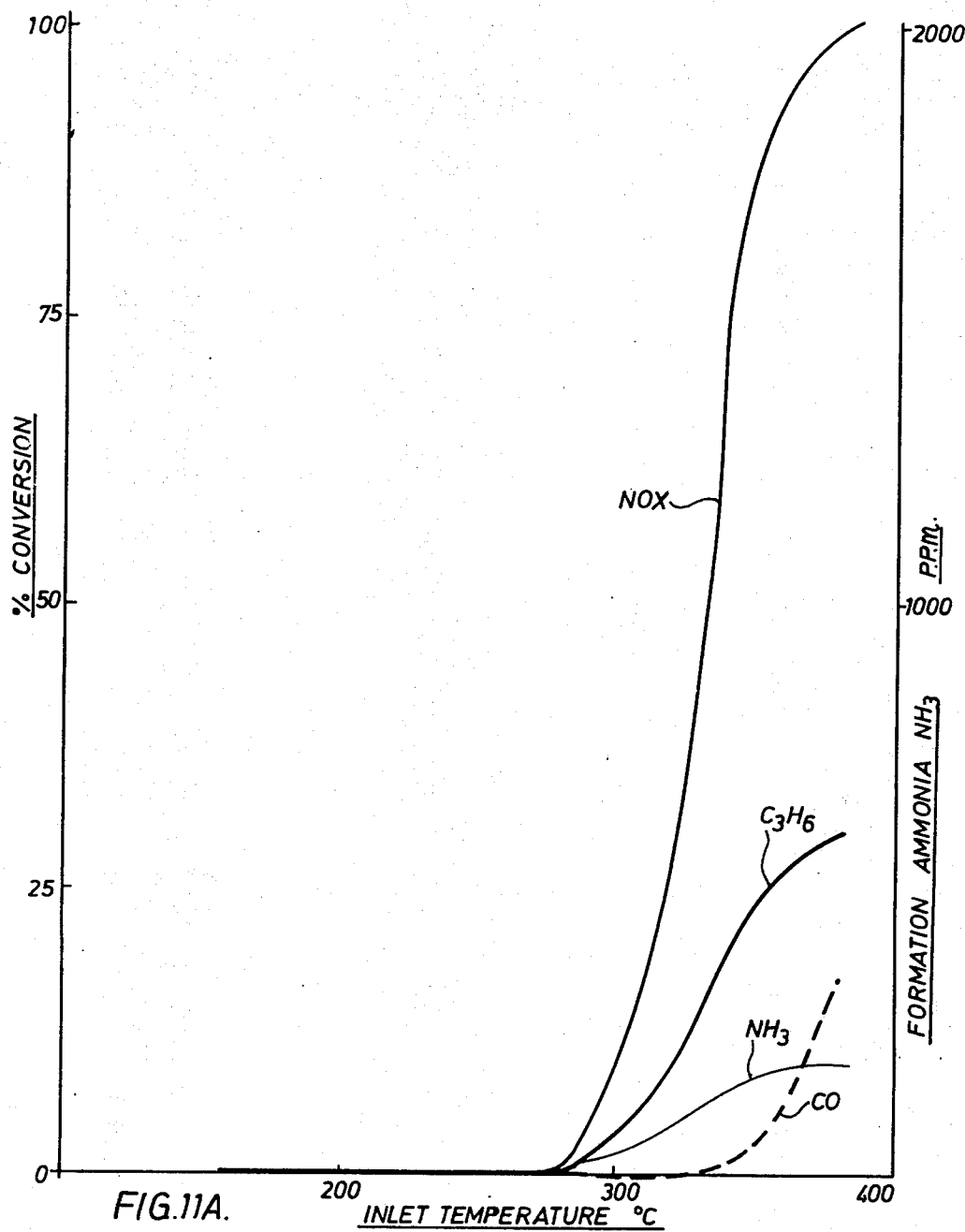
Figure 12:
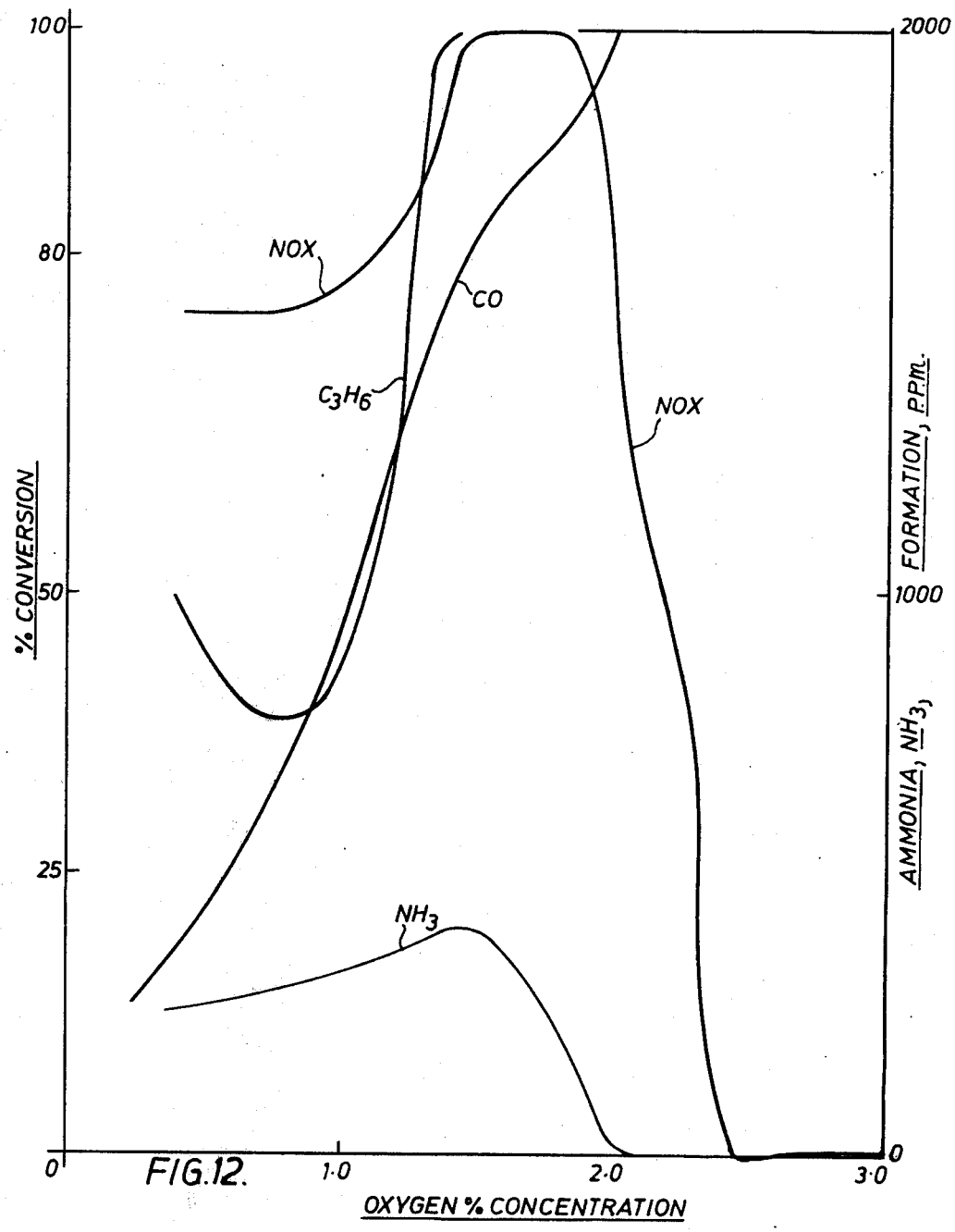
Figure 12A:
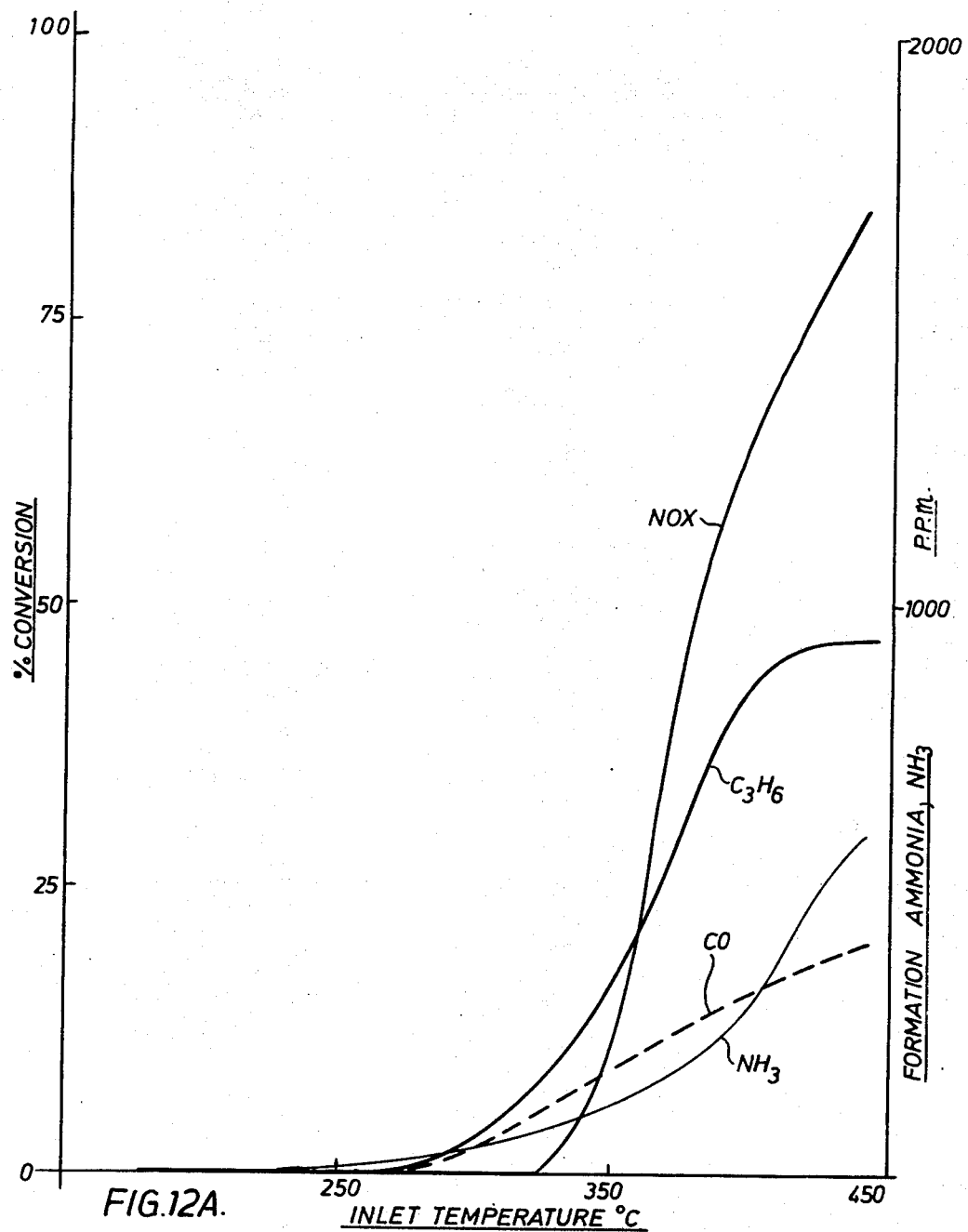
Figure 13A:
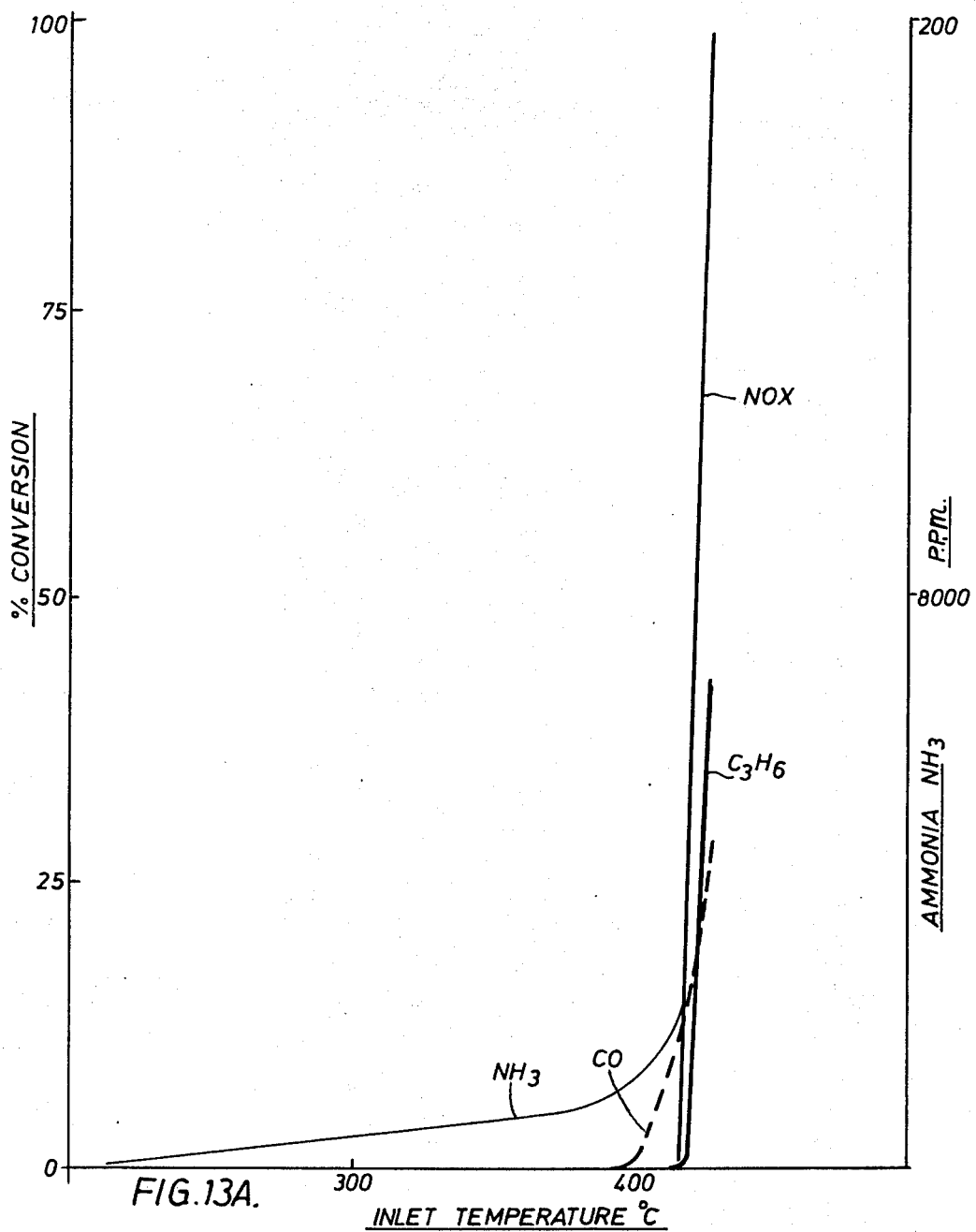
Figure 14:
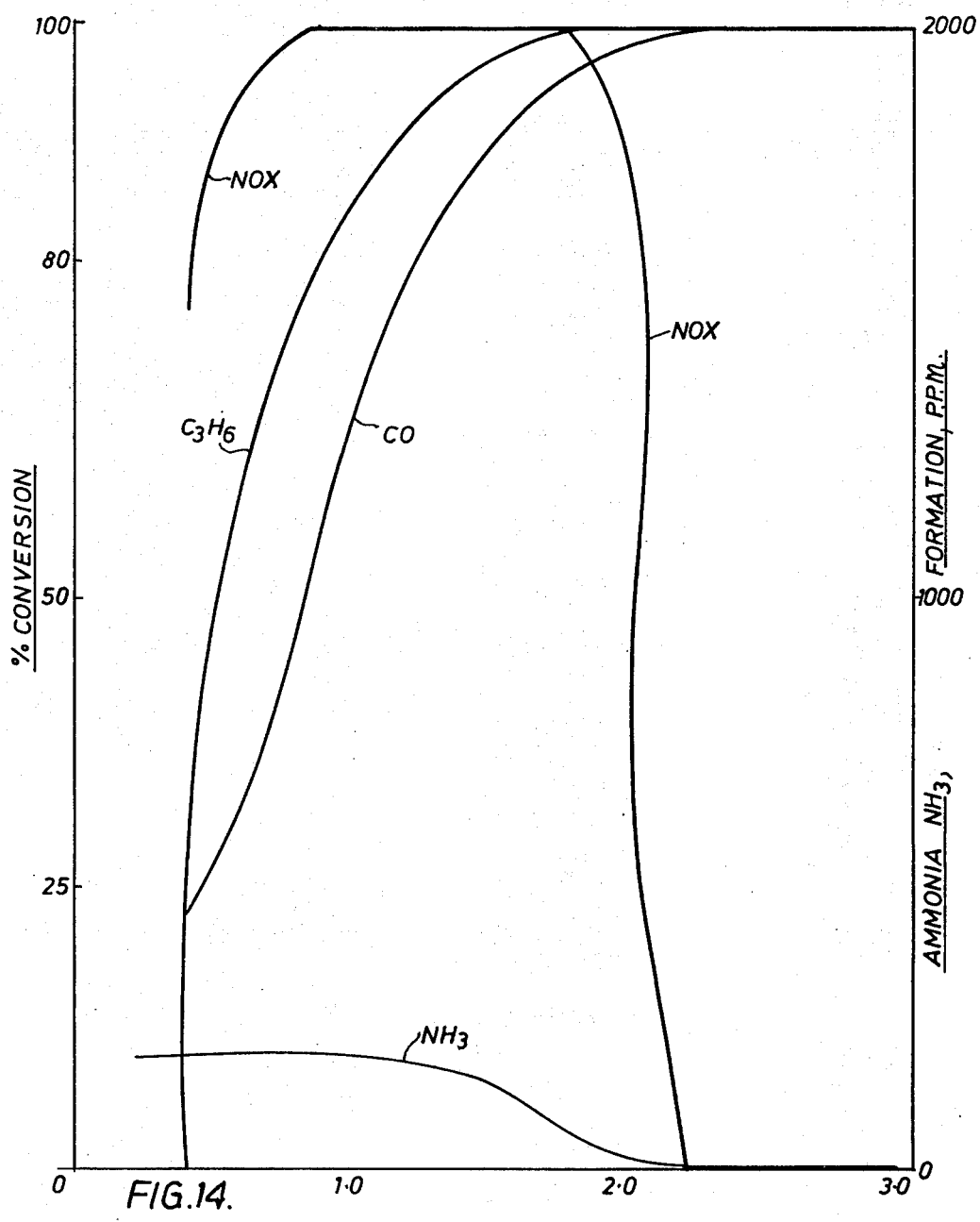
Figure 15A:
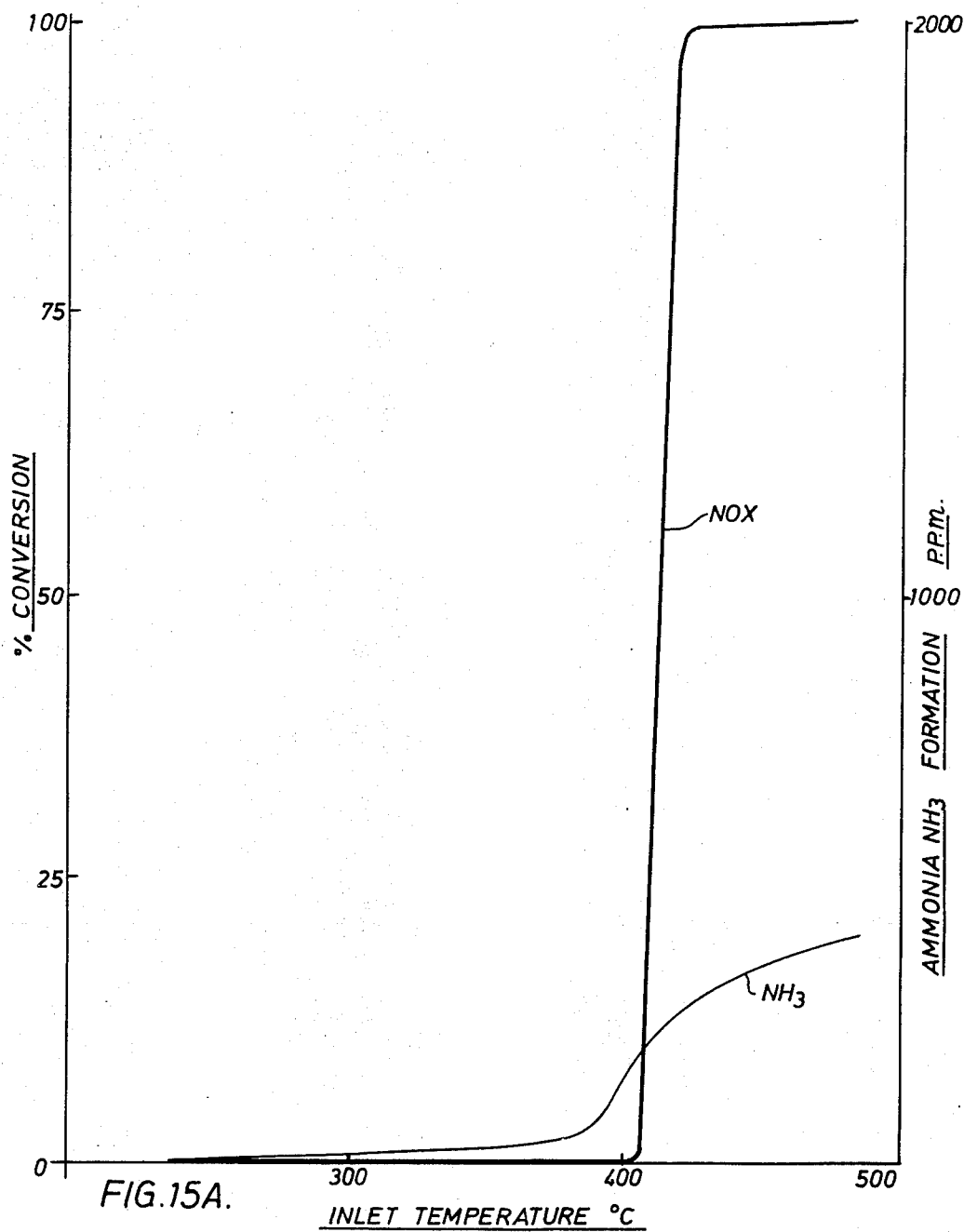
Figure 16A:
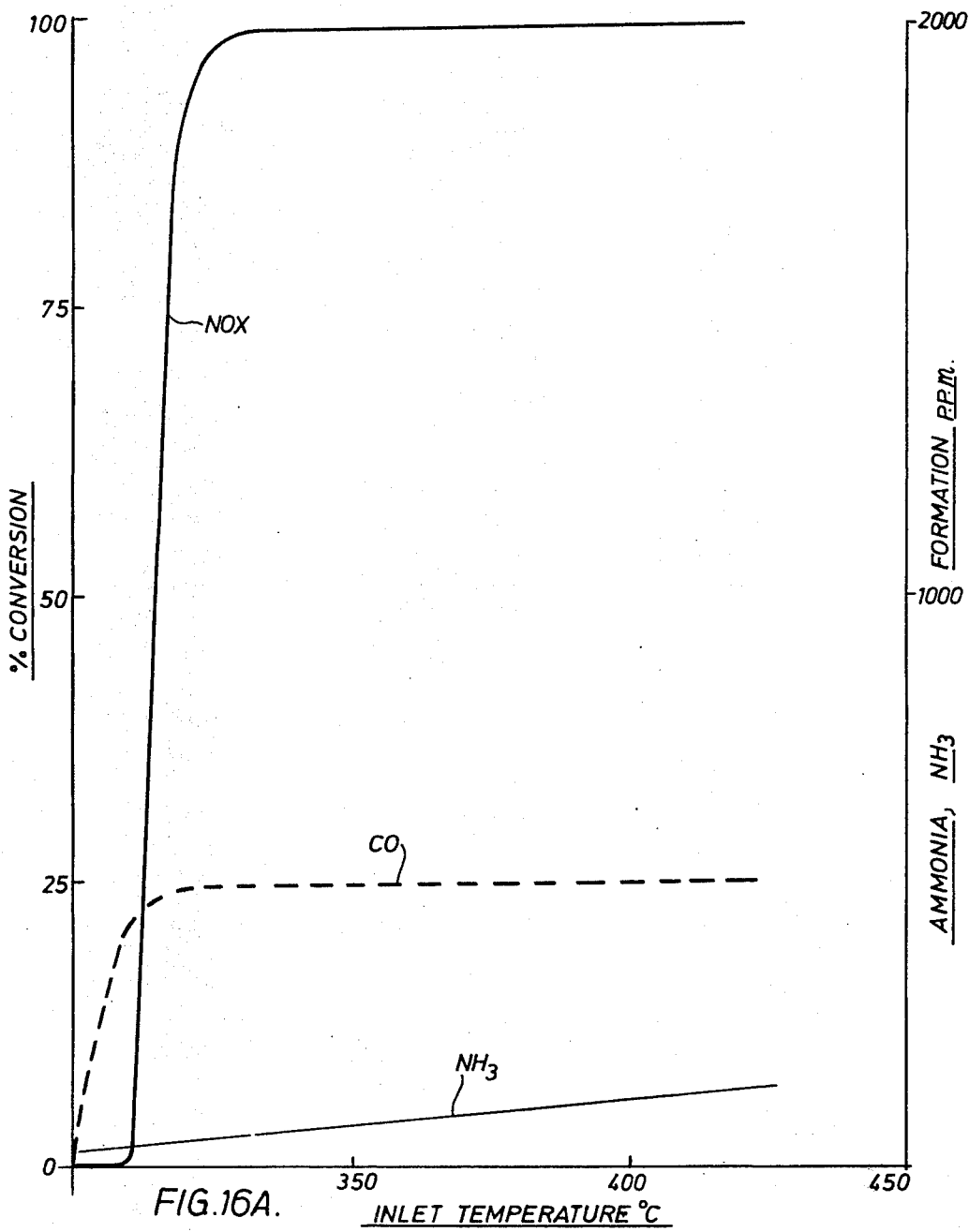

In FIG. 4, percentage conversions are plotted against oxygen concentration (%) in the exhaust for 15% ruthenium/platinum on an 8 corrugations to the one inch (alumina) wash-coated ceramic honeycomb.

The dashed line with points indicated as triangles represents ammonia concentration in parts per million as read on the right hand scale. It can be seen that at approximately 1.5% oxygen in the exhaust the ammonia concentration drops to practically zero. However, the nitric oxide conversion does not begin to fall appreciably until an oxygen level greater than about 2.1% is achieved.

At certain oxygen concentrations, therefore, this catalyst is successful in fully converting all the hydrocarbon, i.e. propylene, carbon monoxide and nitric oxide and at the same time giving a negligible production of ammonia.

EXAMPLE IV

FIGS. 5 to 8 (prepared on the same basis as in FIGS. 1 to 4 for Examples I – III) illustrate the low ammonia formation under both rich and lean conditions of engine operation i.e. at both low and high oxygen concentrations respectively. The line $O_2 = 2.225\%$ represents stoichiometric. Inlet temperature to catalyst bed: 450°C.

FIGS. 9 and 10 show the comparatively high formation of ammonia for 100% Pt and 7.5% Rh/Pt, respectively.

EXAMPLE V

This example illustrates under the same conditions as Example IV, the effect of the presence of base metals in the ruthenium/platinum catalyst. The base metals used were Co, Ni, V, Re, Fe, and Cr, and the compositions of the respective catalysts and the Figures relevant thereto are shown in the following table:

| Figure No. | Base Metal Wt% | Ruthenium Wt% | Platinum Wt% |
| --- | --- | --- | --- |
| 11 | 20 Co | 30 | 50 |
| 11A | | | |
| 12 | 20 Ni | 30 | 50 |
| 12A | | | |
| 13 | 10 V | 28 | 62 |
| 13A | | | |
| 14 | 24 Fe | 24 | 52 |
| 14A | | | |
| 15 | 20 Cr | 30 | 50 |
| 15A | | | |
| 16 | 5 Re | 35 | 60 |
| 16A | | | |

In the above FIGS. 11 to 16 show percentage conversions plotted against oxygen concentration whereas FIGS. 11A to 16A show the percentage conversion plotted against inlet temperature (°C.) and each Figure includes a graph indicating the extent of the formation of ammonia in the reaction.

In this example, the catalyst support consisted or Therma Comb (Registered Trade Mark, American Lava Corporation) honeycomb support having 8 corrugations per inch and wash coated with MH 170 alumina (manufactured by the British Alumina Company).

The results of this example show the usefulness of the presence of up to 30 wt% of a base metal in Ru/Pt catalysts for the chemical conversion of oxides of nitrogen at low temperature (e.g. cold starting conditions of an internal combustion engine) and the considerably lower formation of ammonia over the total range of oxygen concentration.

EXAMPLE VI

A two stage catalyst system including as a first stage, a catalyst comprising 35 wt% Ru/Pt deposition MH 170 alumina washcoated Therma Comb (see Example V) was fitted in a British Morris Marina motor car and tested over 50,000 miles with the results shown in the following table which also includes for purposes of comparison the 1976 limits set by the Environmental Protection Agency of the United States of America.

| | CO gm/mile | Hydrocarbons gm/mile | NOX gm/mile |
| --- | --- | --- | --- |
| 1976 limits | 3.4 | 0.41 | 0.4 |
| Marina with catalyst | 1.78 | 0.17 | 0.25 |
| Marina without catalyst | 13.25 | 2.89 | 2.64 |

What we claim is:

1. A process for the reduction of an oxide of nitrogen present in a gas including passing at an elevated temperature the gas together with a gaseous fuel through a supported catalyst comprising an inert material impregnated or coated with a mixture or alloy comprising, apart from impurities, 5 to 75 wt% ruthenium, some up to 30 wt% base metal selected from the group consisting of Al, Mg, Cr, Mo, W, Mn, Fe, Re, Co, Ni, Ti, V, Th, U, Cu, Ag, Zn, Cd, Hg, In, Tl, Bi, Sn, Pb, Sb, the lanthanides and the actinides and balance platinum in an amount not less than 5 wt%.

2. A process for the oxidation of carbon monoxide or one or more organic compounds present in a gas including passing, at elevated temperature, the gas together with oxygen through a supported catalyst comprising an inert material impregnated or coated with a mixture of alloy comprising, apart from impurities, 5 to 75 wt% ruthenium, some up to 30 wt% base metal selected from the group consisting of Al, Mg, Cr, Mo, W, Mn, Fe, Re, Co, Ni, Ti, V, Th, U, Cu, Ag, Zn, Cd, Hg, In, Tl, Bi, Sn, Pb, Sb, the lanthanides and the actinides and balance platinum in an amount not less than 5 wt%.

3. A process according to claim 1 wherein the mixture or alloy contains 5 to 65 wt% ruthenium.

4. A process according to claim 3 wherein the mixture or alloy contains 10 to 60 wt % ruthenium.

5. A process according to claim 3 wherein the mixture or alloy contains 5 to 45 wt% ruthenium.

6. A process according to claim 3 wherein the mixture or alloy contains 35 wt% ruthenium.

7. A process according to claim 3 wherein the mixture or alloy contains 5 to 10 wt% ruthenium.

8. A process according to claim 1 wherein the mixture or alloy contains a trace to 20 wt% base metal.

9. A process according to claim 1 wherein the inert material support is pretreated with a refractory oxide which is unreactive with the inert material and before application thereto of the mixture or alloy.

10. A process according to claim 9 wherein the refractory oxide is selected from the oxides of scandium, yttrium, the lanthanides, and of the metals of Groups III and IV of the Periodic Table.

11. A process according to claim 10 wherein the refractory oxide is selected from the group consisting of oxides of Be, Mg, B Al, Si, Ti, Zr, Hf, and Th.

12. A process according to claim 10 wherein the refractory oxide is an oxide of neodymium.

13. A process according to claim 9 wherein the treatment is in the form of a continuous or discontinuous film of thickness 0.0004 to 0.001 inch.

14. A process according to claim 1 in which the inert material is a unitary porous refractory compound.

15. A process according to claim 14 in which the refractory compound is selected from the group consisting of oxides of Mg, Ca, Sr, Ba, Al, Sc, Y, the lanthanides, the actinides, Ga, In, Tl, Si, Ti, Zr, Hf, Th, Ge, Sn, Pb, V, Nb, Ta, Cr, Mo, W, U, transition metal carbides, borides and silicides.

16. A process according to claim 14 in which the refractory compound is in the form of a ceramic material.

17. A process according to claim 14 in which the refractory compound is of a corrugated cellular structure.

18. A process according to claim 17 in which the corrugated cellular structure is a honeycomb.

19. A process according to claim 16 in which the ceramic material is selected from the group consisting of zircon-mullite, mullite, alpha alumina, sillimanite, magnesium silicates, zircon, petalite, spodumene, cordierite and alumino silicates.

20. A process according to claim 2 wherein the mixture or alloy contains 5 to 65 wt% ruthenium.

21. A process according to claim 2 wherein the mixture or alloy contains 10 to 60 wt% ruthenium.

22. A process according to claim 2 wherein the mixture or alloy contains 5 to 45 wt% ruthenium.

23. A process according to claim 2 wherein the mixture or alloy contains 35 wt% ruthenium.

24. A process according to claim 2 wherein the mixture or alloy contains 5 to 10 wt% ruthenium.

25. A process according to claim 2 wherein the mixture or alloy contains a trace to 20 wt% base metal.

26. A process according to claim 2 wherein the inert material support is pretreated with a refractory oxide which is unreactive with the inert material and before application thereto of the mixture or alloy.

27. A process according to claim 26 wherein the refractory oxide is selected from the oxides of scandium, yttrium, the lanthanides, and of the metals of Groups III and IV of the Periodic Table.

28. A process according to claim 27 wherein the refractory oxide is selected from the group consisting of oxides of Be, Mg, B, Al, Si, Ti, Zr, Hf, and Th.

29. A process according to claim 27 wherein the refractory oxide is an oxide of neodymium.

30. A process according to claim 26 wherein the treatment is in the form of a continuous or discontinuous film of thickness 0.0004 to 0.001 inch.

31. A process according to claim 2 wherein the inert material is a unitary porous refractory compound.

32. A process according to claim 31 wherein the refractory compound is selected from the group consisting of oxides of Mg, Ca, Sr, Ba, Al, Sc, Y, the lanthanides, the actinides, Ga, In, Tl, SI, Ti, Zr, Hf, Th, Ge, Sn, Pb, V, Nb, Ta, Cr, Mo, W, U, transition metal carbides, borides and silicides.

33. A process according to claim 31 wherein the refractory compound is in the form of a ceramic material.

34. A process according to claim 31 wherein the refractory compound is of a corrugated cellular structure.

35. A process according to claim 34 wherein the corrugated cellular structure is a honeycomb.

36. A process according to claim 33 wherein the ceramic material is selected from the group consisting of zircon-mullite, mullite, alpha alumina, sillimanite, magnesium silicates, zircon, petalite, spodumene, cordierite and alumino silicates.

37. A process according to claim 1 wherein the base metal is Co, Ni, V, Fe, Cr or Re.

* * * * *